(12) United States Patent
Nakamura

(10) Patent No.: US 7,385,770 B2
(45) Date of Patent: *Jun. 10, 2008

(54) IMAGING LENS SYSTEM

(75) Inventor: Akira Nakamura, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/789,214

(22) Filed: Apr. 24, 2007

(65) Prior Publication Data

US 2007/0195432 A1  Aug. 23, 2007

Related U.S. Application Data

(62) Division of application No. 11/096,877, filed on Mar. 31, 2005.

(30) Foreign Application Priority Data

Apr. 23, 2004 (JP) ............... 2004-128162

(51) Int. Cl.
*G02B 9/12* (2006.01)
(52) U.S. Cl. ............... 359/784; 359/754; 359/785
(58) Field of Classification Search ............... 359/784, 359/785, 771–775, 763–766, 754–758
See application file for complete search history.

(56) References Cited

U.S. PATENT DOCUMENTS 6,147,816 A  11/2000  Ori

| | | | |
|---|---|---|---|
| 6,927,925 B2 | 8/2005 | Amanai | |
| 7,251,083 B2 * | 7/2007 | Kubota et al. | ............ 359/716 |
| 2004/0021957 A1 | 2/2004 | Isono | |
| 2004/0061953 A1 | 4/2004 | Sato | |
| 2005/0002116 A1 | 1/2005 | Nakamura | |
| 2005/0094292 A1 | 5/2005 | Cahall et al. | |

FOREIGN PATENT DOCUMENTS

| EP | 1 348 990 | 10/2003 |
|---|---|---|
| JP | 2001-075006 | 3/2001 |
| JP | 2001-083409 | 3/2001 |
| WO | WO 2004038478 A1 * | 5/2004 |

* cited by examiner

*Primary Examiner*—Scott J. Sugarman
*Assistant Examiner*—Darryl J. Collins
(74) *Attorney, Agent, or Firm*—William L. Androlia; H. Henry Koda

(57) ABSTRACT

An object is to provide an imaging lens system which can achieve reduction of the size and weight while maintaining the high optical performance. The imaging lens system of the present invention comprises, in order form an object side to an imaging surface side: a first lens having a positive power with its convex surface facing the object side; a second lens in a meniscus shape having a positive power with its concave surface facing the object side; and a third lens functioning as a correction lens, wherein the imaging lens system satisfies following expressions: $0.25 < r_1/f < 0.50$, and $-0.27 < r_3/f < -0.19$ (where, $r_1$: a radius of center curvature of the surface (first face) of the first lens on the object side, $r_3$: a radius of center curvature of the surface (first face) of the second lens on the object side, f: a focal distance of an entire lens system).

10 Claims, 28 Drawing Sheets

FIG. 7
1: 656.2725nm
2: 587.5618nm
3: 546.0740nm
4: 486.1327nm
5: 435.8343nm
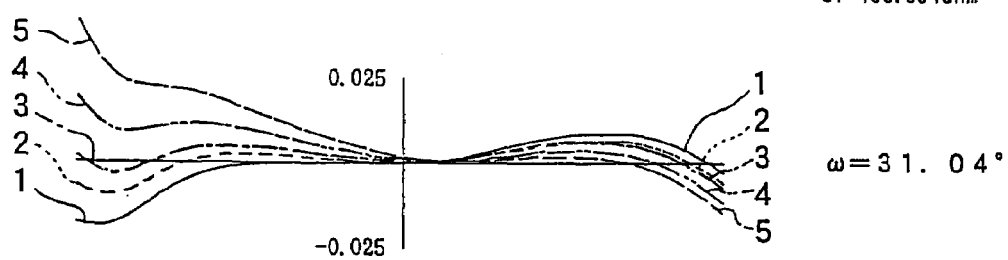
ω=31.04°
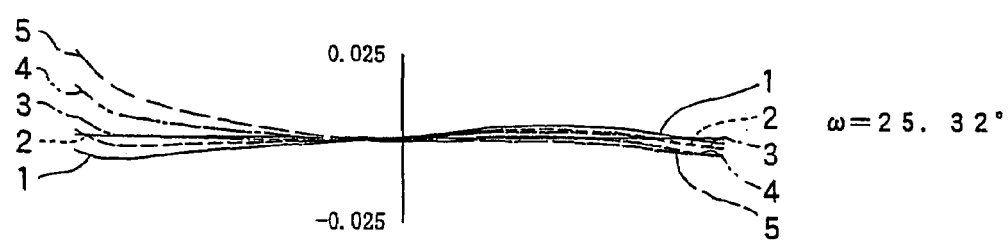
ω=25.32°
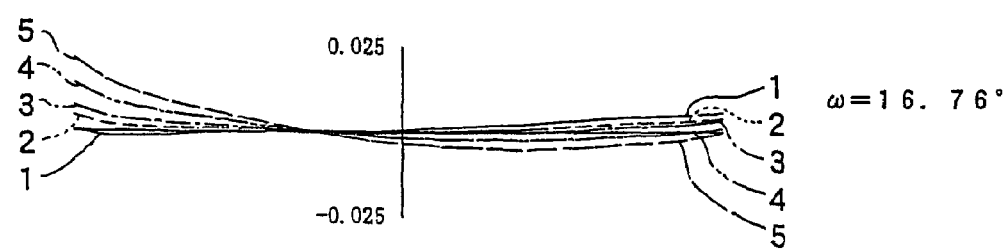
ω=16.76°
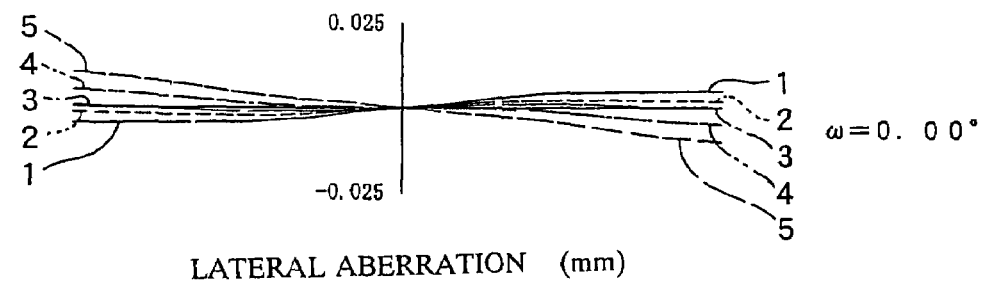
ω=0.00°
LATERAL ABERRATION (mm)

FIG. 13
1: 656.2725nm
2: 587.5618nm
3: 546.0740nm
4: 486.1327nm
5: 435.8343nm
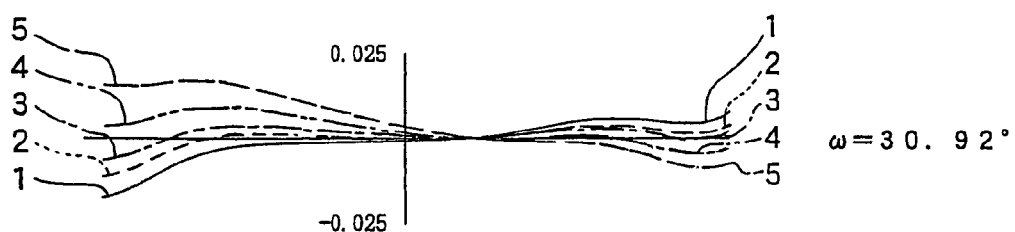
ω=30.92°
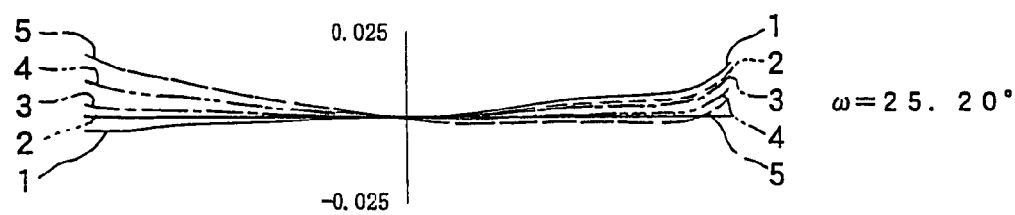
ω=25.20°
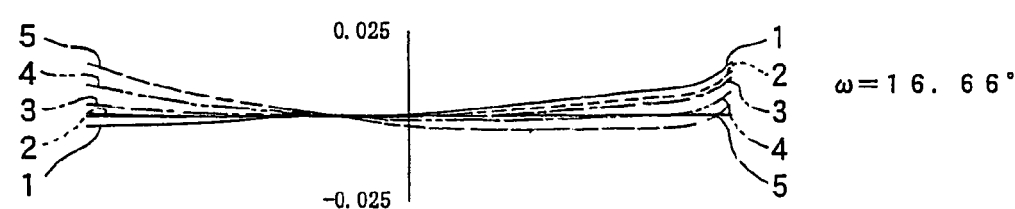
ω=16.66°
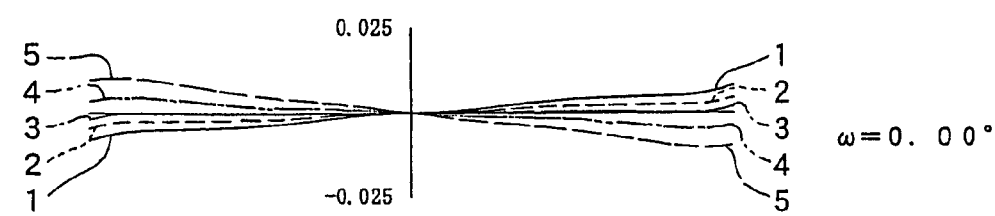
ω=0.00°
LATERAL ABERRATION (mm)

LATERAL ABERRATION (mm)

FIG. 19
1: 656.2725nm
2: 587.5618nm
3: 546.0740nm
4: 486.1327nm
5: 435.8343nm
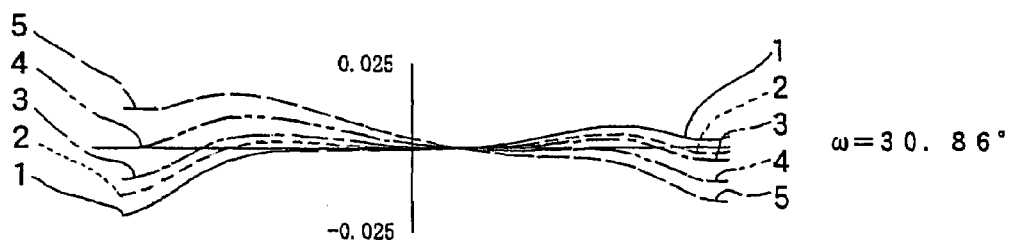
ω=30.86°
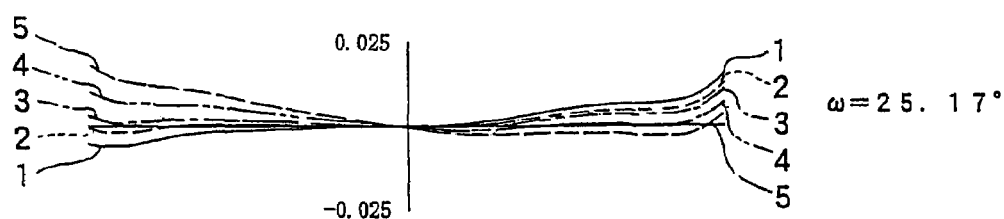
ω=25.17°
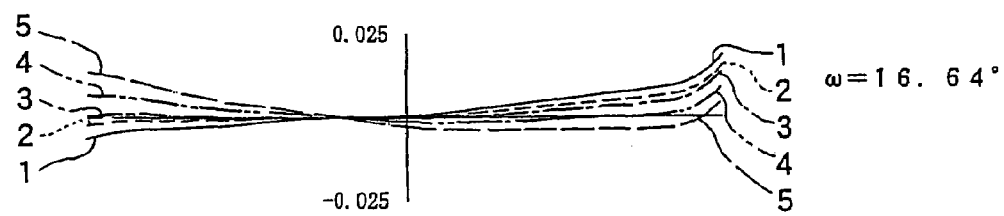
ω=16.64°
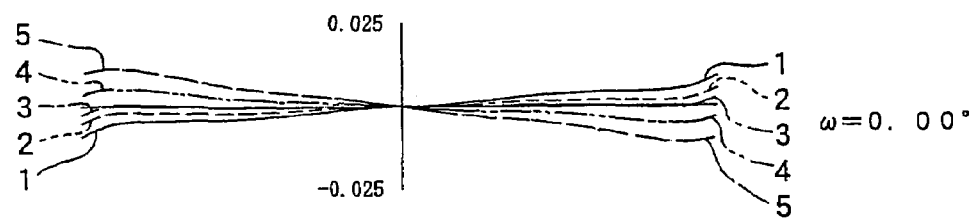
ω=0.00°
LATERAL ABERRATION (mm)

LATERAL ABERRATION (mm)

FIG. 28
1: 656.2725nm
2: 587.5618nm
3: 546.0740nm
4: 486.1327nm
5: 435.8343nm
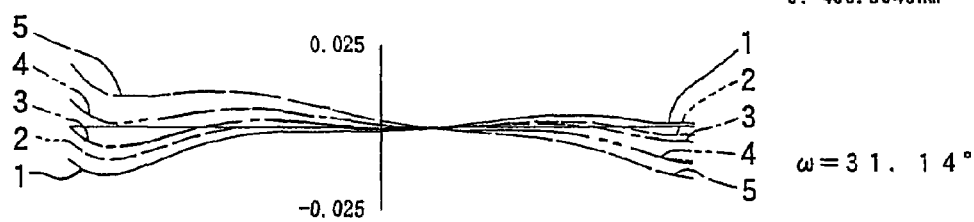
ω=31.14°
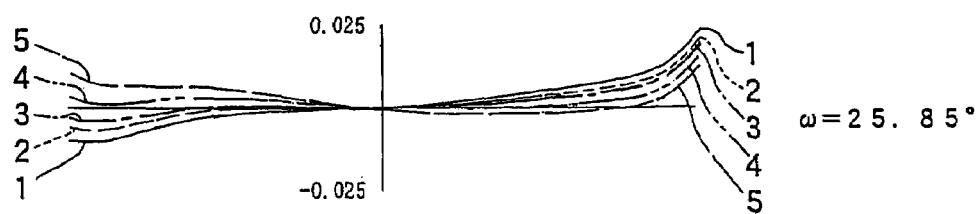
ω=25.85°
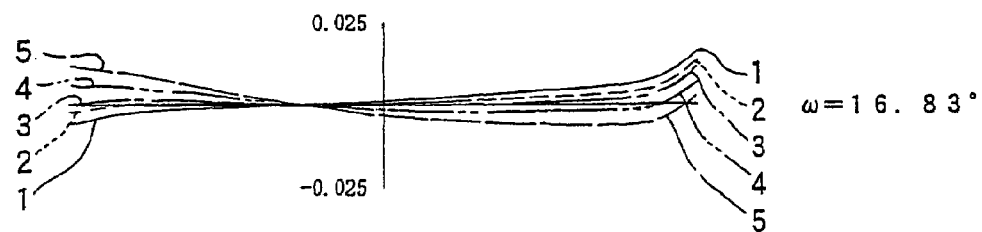
ω=16.83°
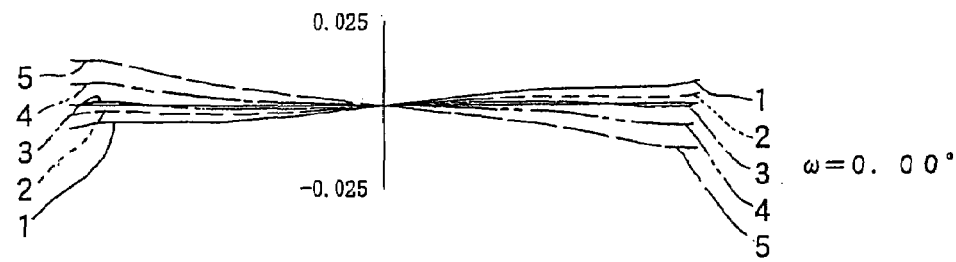
ω=0.00°
LATERAL ABERRATION (mm)

IMAGING LENS SYSTEM

BACKGROUND OF THE INVENTION

1. Field of the Invention

The present invention relates to an imaging lens system and particularly, to an imaging lens system comprising three lenses which can be preferably reduced in size and weight to be used for an image pickup device utilizing an image pickup element such as a CCD, a CMOS or the like to be mounted on a portable computer, a visual telephone, a cellular phone, a digital camera, and the like.

2. Description of the Related Art

Recently, there has been an increasing demand for a camera utilizing an image pickup element such as a CCD, a CMOS or the like to be mounted on a portable computer, a visual telephone, a cellular phone, a digital camera, and the like. Such CCD camera needs to be mounted on a limited space. Thus, it is desirable that the camera be small in size and light in weight.

Accordingly, an imaging lens system used for such CCD camera is also necessary to be small and lightweight as well. Conventionally, the so-called one-lens system using a single lens or the two-lens system using two lenses is used as such imaging lens system.

However, although these types are extremely advantageous in terms of reducing the size and weight of the lens system, they cannot sufficiently meet the high picture quality and high resolution required for the imaging lens system in these days.

Thus, conventionally, the three-lens system using three lenses has been utilized for meeting the demands for the high picture quality and high resolution (see Japanese Unexamined Patent Publication No. 2001-75006, Japanese Unexamined Patent Publication No. 2001-83409).

Recently, especially in the field of the digital cameras and the like, there has been an increasing demand for the image pickup devices using a solid image pickup element with a higher picture quality and resolution of more than 1,000,000 pixels, which tops the conventional CIF (about 110,000 pixels) and VGA (about 300,000 pixels).

However, the conventional lens system is not yet sufficient to achieve the demands for high optical performance such as a high picture quality and high resolution through well-correcting chromatic aberration, while achieving further reduction of the size and weight (shortening the entire length) of the lens system itself.

The present invention has been designed to overcome the foregoing problems. An object of the present invention is to provide an imaging lens system which can, achieve reduction of the size and weight while maintaining the high optical performance.

SUMMARY OF THE INVENTION

In order to achieve the foregoing objects, an imaging lens system according to the present invention comprises: a first lens having a main positive power with its convex surface facing an object side; a second lens in a meniscus shape with its concave surface facing the object side; and a third lens functioning as a correction lens. The three lenses are disposed in order from the object side to the imaging surface side. Also, the imaging lens system according to the present invention satisfies each of following conditional expressions (1), (2):

$$0.25 < r_1/f < 0.50 \quad (1)$$

$$-0.27 < r_3/f < -0.19 \quad (2)$$

where, in the expression (1), $r_1$ is a radius of center curvature of a surface. (first face) of the first lens on the object side and, in the expression (2), $r_3$ is a radius of center curvature of a surface (first face) of the second lens on the object side. Further, in the expressions (1) and (2), f is a focal distance of the entire lens system.

With the imaging lens system of the present invention, by the combination of the first lens, the second lens, and the third lens, it becomes possible to effectively shorten the entire length of the lens system while achieving an excellent correction of various aberrations such as spherical aberration, coma aberration, astigmatism, curvature of field, distortion, and the like.

Also, by satisfying the conditional expression (1), it becomes possible to further shorten the entire length of the lens system while providing more sufficient power on the first surface of the first lens without worsening the various aberrations.

Further, by satisfying the conditional expression (2), it becomes possible to more excellently correct the chromatic aberration and the curvature of the field without worsening the coma aberration, the astigmatism, and the distortion.

Further, it is possible to maintain the telecentricity within a sufficiently permissible range.

Further, the imaging lens system according to the present invention also satisfies the following conditional expression (3):

$$-9.0 < f/r_2 < 1.20 \quad (3)$$

where, in the expression (3), $r_2$ is a radius of center curvature of the surface (second face) of the first lens on the imaging surface side.

With the imaging lens system according to the present invention, further, by satisfying the conditional expression (3), it becomes possible to more excellently correct the astigmatism and the curvature of the field.

Furthermore, the imaging lens system according to the present invention also satisfies the following conditional expression (4):

$$-0.22 < f/r_6 < 1.30 \quad (4)$$

where, in the expression (4), $r_6$ is a radius of center curvature of the surface (second face) of the third lens on the imaging surface side.

With the imaging lens system according to the present invention, further, by satisfying the conditional expression (4), it becomes possible to correct the astigmatism and the curvature of the field in a well-balanced manner.

Further, the imaging lens system according to the present invention also satisfies the following conditional expressions (5) to (7);

$$40 \leq v_1 \leq 72 \quad (5)$$

$$20 \leq v_2 \leq 40 \quad (6)$$

$$40 \leq v_3 \leq 72 \quad (7)$$

where, in the expressions (5) to (7), $v_1$ is Abbe number of the first lens, $v_2$ is Abbe number of the second lens, and $v_3$ is Abbe number of the third lens.

With the imaging lens system according to the present invention, further, by satisfying the conditional expressions (5) to (7), it becomes possible to correct the axial chromatic aberration more excellently.

Furthermore, in the imaging lens system according to the present invention, the surface of the third lens on the imaging surface side is in a shape which curves towards the object side form its center towards a peripheral side.

With the imaging lens system according to the present invention as described above, it enables to further improve the telecentricity and to more effectively correct the astigmatism in the peripheries.

BRIEF DESCRIPTION OF THE DRAWINGS

FIG. 7 is an explanatory illustration showing lateral aberration of the imaging lens system shown in FIG. 5;

FIG. 13 is an explanatory illustration showing lateral aberration of the imaging lens system shown in FIG. 11;

FIG. 19 is an explanatory illustration showing lateral aberration of the imaging lens system shown in FIG. 17;

FIG. 28 is an explanatory illustration showing lateral aberration of the imaging lens system shown in FIG. 26.

DETAILED DESCRIPTION OF THE INVENTION

An embodiment of the imaging lens system according to the present invention will be described by referring to FIG. 1.

Figure 1:
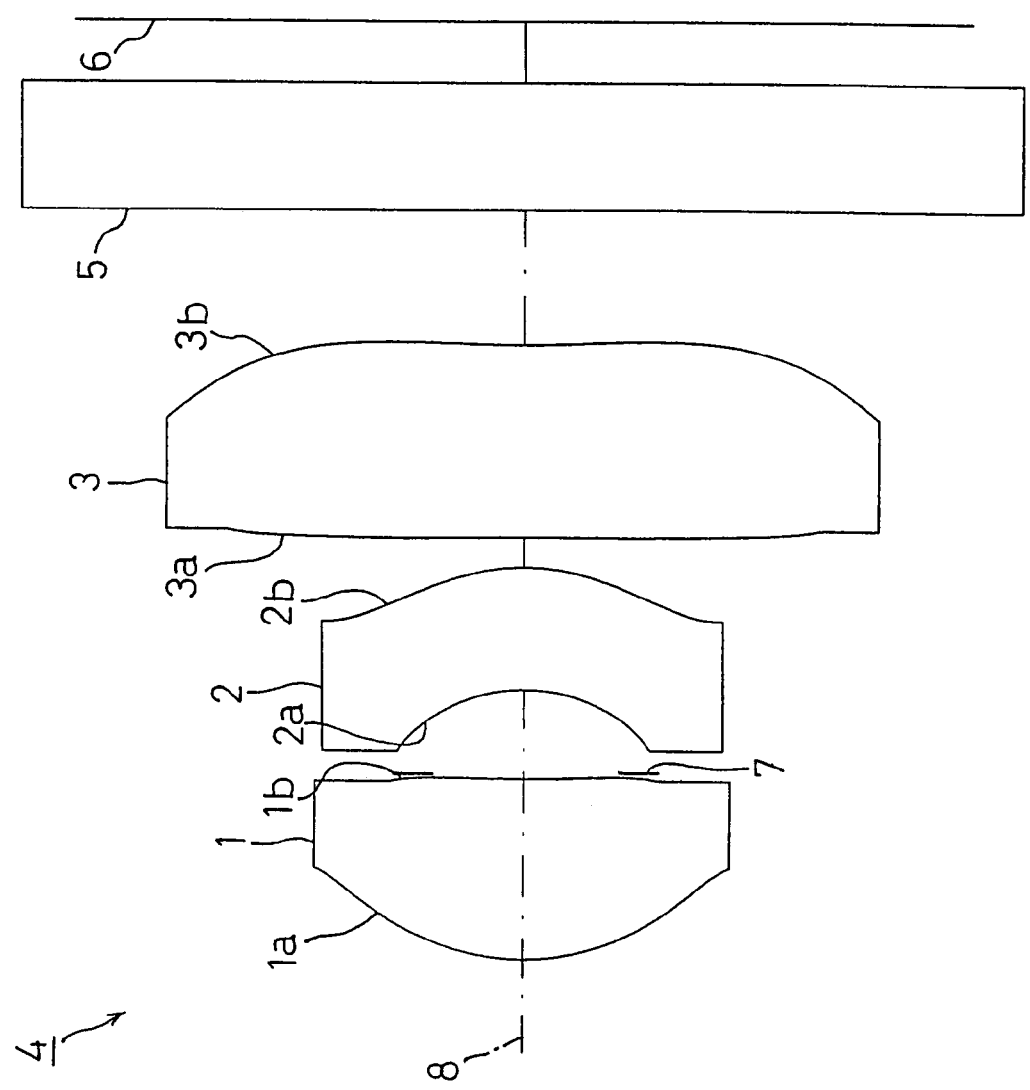
FIG. 1 is a schematic illustration showing an embodiment of an imaging lens system according to the present invention.

As shown in FIG. 1, an imaging lens system 4 of the embodiment comprises, in order from an object side to an imaging surface side, a first lens 1 having a main positive power with its convex surface facing an object side, a second lens 2 in a meniscus shape with its concave surface facing the object side, and a third lens 3 functioning as a correction lens. A lens face 1a of the first lens 1 on the object side, a lens face 2a of the second lens 2, and a lens face 3a of the third lens 3 are referred to as first faces 1a, 2a, and 3a, respectively, while lens faces 1b, 2b, and 3b on the imaging surface side are referred to as second faces 1b, 2b, and 3b of the respective lenses.

On the second face 3b side of the third lens 3, provided are various filters 5 such as a cover glass, an IR cut filter, a lowpass filter, and the like, and an image pickup surface 6 as a light-receiving surface of an image pickup element such as a CCD or a CMOS. The various filters 5 may be omitted as appropriate.

In the embodiment, by combining the first lens 1, the second lens 2, and the third lens 3 formed as described above, it becomes possible to effectively shorten the entire length of the lens while achieving an excellent correction of various aberrations such as spherical aberration, coma aberration, astigmatism, curvature of field, distortion, and the like.

Further, in the embodiment, a diaphragm 7 is provided between the first lens 1 and the second lens 2. More preferably, the placing position of the diaphragm 7 is set to be a position which is closer to the second face 1b of the first lens than the middle point of a line segment on an optical axis 8 connecting the center (the vertex of the surface) of the second face 1b of the first lens and the center (the vertex of the surface) of the first face 2a of the second lens 2.

Thereby, it is possible to dispose the lens faces 1a, 1b of the first lens having the main power in the vicinity of the diaphragm 7 where the light rays are not spread. Therefore, the light rays making an incident from the object side can be appropriately concentrated without worsening the aberrations. As a result, the entire length of the imaging lens system 4 can be more effectively shortened.

In the embodiment, further, each of the following conditional expressions (1) (2) is to be satisfied:

$$0.25 \leq r_1/f \leq 0.50 \text{ (more preferably, } 0.3 \leq r_1/f \leq 0.45) \quad (1)$$

$$-0.27 < r_3/f < -0.19 \text{ (more preferably, } -0.24 < r_3/f < -0.19) \quad (2)$$

where, in the expression (1), $r_1$ is a radius of center curvature of the first face 1a of the first lens, and in the expression (2), $r_3$ is a radius of center curvature of the first face 2a of the second lens. Also, in the expressions (1), (2), f is a focal distance of an entire lens system.

If the value of $r_1/f$ becomes the value (0.50) indicated in the expression (1) or larger, the positive curvature of the first face 1a of the first lens 1 becomes too small. That is, the absolute value of the curvature radius (positive) of the first face 1a of the first lens 1 becomes too large so that a sufficient power cannot be attained by the first lens 1.

Thereby, it becomes inevitable to rely on at least either the second lens 2 or the third lens 3 for the positive power. As a result, it becomes impossible to keep the balance between the shortening of the entire length of the lens system and the correction of the aberrations.

In the meantime, if the value of $r_1/f$ becomes the value (0.25) indicated in the expression (1) or smaller, the positive curvature of the first face 1a of the first lens 1 becomes too large. That is, the absolute value of the curvature radius (positive) of the first face 1a of the first lens 1 becomes too small so that the angle of incident of the main light ray with respect to the first face 1a of the first lens 1 becomes too large. As a result, the aberrations are rather worsened.

Further, if the value of $r_3/f$ becomes the value (−0.27) indicated in the expression (2) or smaller, the curvature of the field cannot be sufficiently corrected.

In the meantime, if the value of $r_3/f$ becomes the value (−0.19) indicated in the expression (2) or larger, the coma aberration, the astigmatism, and the distortion are worsened.

Therefore, in the embodiment, by setting the value of $r_1/f$ to satisfy the conditional expression (1), it becomes possible to provide the sufficient power to the first face 1a of the first lens 1 without worsening the various aberrations. As a result, it enables to shorten the entire length of the lens system while maintaining the excellent optical performance.

Further, by setting the value of $r_3/f$ to satisfy the conditional expression (2), it becomes possible to more excellently correct the chromatic aberration and the curvature of field without worsening the coma aberration, the astigmatism, and the distortion.

Furthermore, by satisfying both the conditional expression (1) and the conditional expression (2) under the state where the diaphragm 7 is disposed between the first lens 1 and the second lens 2, it is possible to form the first face 1a of the first lens 1 and the first face 2a of the second lens 2 to be in the shapes which are symmetrical with each other. Therefore, the distortion, the coma aberration, and the magnification chromatic aberration can be more excellently corrected.

By employing the configuration as described above, it is also possible to maintain the telecentricity within a sufficiently permissible range.

Further, in the embodiment, the following conditional expression (3) is to be also satisfied;

$$-0.90 < f/r_2 < 1.20 \text{ (preferably, } -0.70 < f/r_2 < 0.90, \text{ more preferably, } -0.50 < f/r_2 < 0.75) \quad (3)$$

where, in the expression (3), $r_2$ is a radius of center curvature of the second face 1b of the first lens 1.

If the value of $f/r_2$ becomes the value (−0.90) indicated in the expression (3) or smaller, the negative curvature of the second face 1b of the first lens 1 becomes too large. That is, the absolute value of the curvature radius (negative) of the second face 1b of the first lens 1 becomes too small so that the positive power of the first lens is weakened.

Thereby, it becomes inevitable to rely on at least either the second lens 2 or the third lens 3 for the positive power. As a result, the various aberrations such as the astigmatism and the curvature of field are to be worsened.

In the meantime, if the value of $f/r_2$ becomes the value (1.20) indicated in the expression (3) or larger, the positive curvature of the second face 1b of the first lens 1 becomes too large. That is, the absolute value of the curvature radius (positive) of the second face 1b of the first lens 1 becomes too small so that the astigmatism and the curvature of field are also worsened.

Therefore, in the embodiment, by setting the value of $f/r_2$ to satisfy the conditional expression (3), the astigmatism and the curvature of field can be more excellently corrected.

Further, in the embodiment, the following conditional expression (4) is also to be satisfied:

$$-0.22 < f/r_6 < 1.30 \text{ (more preferably, } -0.10 < f/r_6 < 1.00) \quad (4)$$

where, in the expression (4), $r_6$ is a radius of center curvature of the second face 3b of the third lens 3.

If the value of $f/r_6$ becomes the value (−0.22) indicated in the expression (4) or smaller, the negative curvature of the second face 3b of the third lens 3 becomes too large. That is, the absolute value of the curvature radius (negative) of the second face 3b of the third lens 3 becomes too small.

As a result, the Petzval sum is decreased and the curvature of field can be excellently corrected, however, the astigmatism is worsened.

Further, the negative power of the third lens 3 becomes excessively strong so that it is necessary to further increase the positive power of the first lens 1. As a result, it becomes difficult to correct the various aberrations in a well-balanced manner and the performance of the imaging lens system 4 is deteriorated.

Meanwhile, if the value of $f/r_6$ becomes the value (1.30) indicated in the expression (4) or larger, the positive curvature of the second face 3b of the third lens 3 becomes too large. That is, the absolute value of the curvature radius (positive) of the second face 3b of the third lens 3 becomes too small.

As a result, while the astigmatism can be excellently corrected, the Petzval sum is increased and correction of the curvature of field becomes difficult.

Therefore, in the embodiment, each of following conditional expressions (5) to (7) is also to be satisfied:

$$40 \leq v_1 \leq 72 \quad (5)$$

$$20 \leq v_2 \leq 40 \quad (6)$$

$$40 \leq v_3 \leq 72 \quad (7)$$

where, in the expression (5), $v_1$ is Abbe number of the first lens 1, $v_2$ is Abbe number of the second lens 2, and $v_3$ is Abbe number of the third lens 3.

As described above, by forming the first lens 1 and the third lens 3 using an optical material with a low dispersion (v is large) and forming the second lens 2 by an optical material with a high dispersion (v is small), it becomes possible to correct the axial chromatic aberration more excellently.

The optical materials for forming each of the lenses 1, 2, 3 may be glass and a resin material (plastics and the like), for example. However, by forming all the lenses 1, 2, 3 using a resin material, each of the lenses 1, 2, 3 can be easily formed by ejection molding or the like of the resin. Therefore, it enables to achieve an imaging lens system at a still lower cost.

Further, in the embodiment, the second face 3b of the third lens 3 is formed in a shape which curves towards the object side from the center towards the peripheral side.

Therefore, the portion in the periphery of the second face 3b of the third lens 3 can be formed to a convex face projecting towards the imaging surface side, so that the light rays in the periphery can be bent towards the inner side (the optical axis 8 side) by the portion in the periphery of the second face 3b formed as the convex face. As a result, the telecentricity can be more improved.

Further, by the portion in the periphery of the second face 3b of the third lens 3 formed as the convex face, the light rays on the tangential side can be bent towards the inner side. As a result, it enables to correct the astigmatism in the periphery more effectively.

In addition to the above-described configuration, further, in each of the first lens 1, the second lens 2, the third lens 3, at least one of the first faces 1a, 2a, 3a or the second faces 1b, 2b, 3b may be formed in an aspherical shape.

With such configuration, the various aberrations can be more excellently corrected.

When forming the second face 2b of the second lens 2, it is preferable to form the second face 2b of the second lens 2 to be in a shape in which the curvature becomes smaller from the center towards the peripheral side.

Thereby, the peripheral side of the second lens 2 can be formed as a concave lens so that the magnification chromatic aberration in the periphery can be more excellently corrected.

Further, in addition to the above-described configuration, it is preferable to also form the first face 3a of the third lens 3 to be in flat shape or similar to that shape.

Thereby, the light rays can be bent towards the inner side by the portion in the peripheral side of the first face 3a of the third lens 3 so that the telecentricity can be more improved. Further, since the first face 3a of the third lens 3 is almost flat, it enables to reduce the influence on the optical performance even if there is an axial shift caused by the eccentricity at the time of manufacture.

EXAMPLES

Next, EXAMPLES of the present invention will be described by referring to FIG. 2 to FIG. 25.

In EXAMPLES, F no denotes F-number, $\omega$ denotes a half angle of view, and r denotes the radius of center curvature. Further, d denotes the distance to the next optical surface, nd denotes the index of refraction against the d line and $\nu$ d denotes the Abbe number (d line being the reference).

k, A, B, C, and D denote each coefficient in a following expression (8). In other words, the shape of the aspherical surface is expressed by the following expression provided that the optical axial 8 direction is the Z axis, the direction orthogonal to the optical axis 8 (the height direction) is the X axis, the traveling direction of light is positive, k is the constant of cone, A, B, C, D are the aspherical coefficients, and r is the radius of center curvature;

$$Z(X)=r^{-1}X^2/[1+\{1-(k+1)r^{-2}X^2\}^{1/2}]+AX^4+BX^6+CX^8+DX^{10} \quad (8)$$

First Example

Figure 2:
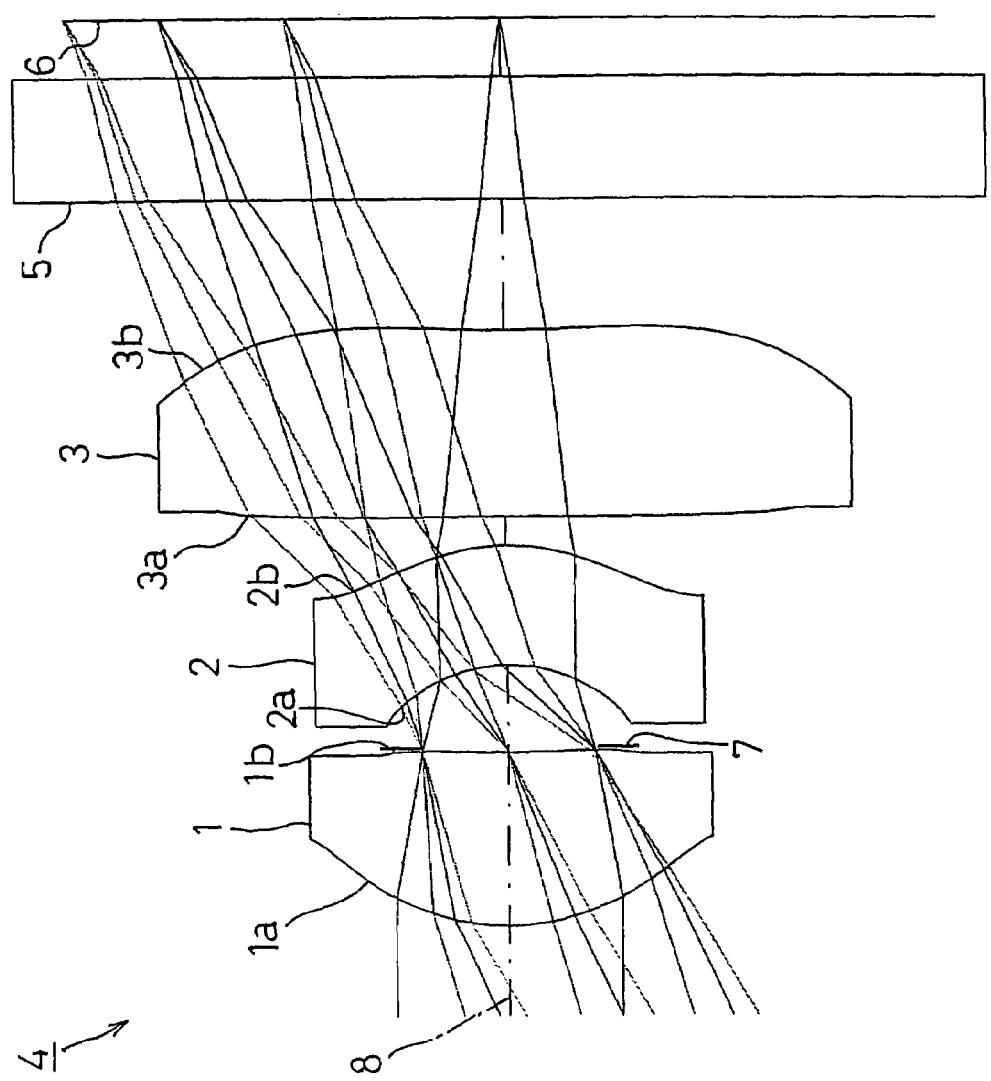
FIG. 2 is a schematic illustration showing FIRST EXAMPLE of an imaging lens system according to the present invention.

FIG. 2 shows FIRST EXAMPLE of the present invention. In FIRST EXAMPLE, an imaging lens system 4 shown in FIG. 2 was in the same configuration as that of the imaging lens system 4 shown in FIG. 1 and a diaphragm 7 was disposed between the first lens 1 and the second lens 2. The diaphragm 7 was regarded as the same surface as the second face 1b 2a of the first lens 2. Each of the first to third lenses 1, 2, 3 was formed using a resin material.

The imaging lens system 4 of FIRST EXAMPLE was set under the following conditions.

(Lens Data)

| (Lens Data) f = 5.00 mm, F no = 3.18, $\omega$ = 30.99° | | | | |
|---|---|---|---|---|
| Face Number | r | d | nd | $\nu$d |
| (Object Point) | ∞ | 1000.00 | | |
| 1 (First Face of First Lens) | 1.67207 | 1.200 | 1.5300 | 55.8 |
| 2 (Second Face of First Lens) (Diaphragm) | 10.95995 | 0.590 | | |
| 3 (First Face of Second Lens) | −1.15954 | 0.820 | 1.6070 | 27.0 |
| 4 (Second Face of Second Lens) | −1.41795 | 0.200 | | |
| 5 (First Face of Third Lens) | −33.10555 | 1.270 | 1.5300 | 55.8 |
| 6 (Second Face of Third Lens) | 9.07325 | 0.900 | | |
| 7 (First Face of Cover Glass) | ∞ | 0.850 | 1.5168 | 64.2 |
| 8 (Second Face of Cover Glass) | ∞ | 0.410 | | |
| (Image Surface) | ∞ | −0.010 | | |

| Face No. | k | A | B | C | D |
|---|---|---|---|---|---|
| 1 | −0.894566 | 0.243192e−01 | 0.162251e−02 | 0.533342e−02 | −0.594036e−02 |
| 2 | 0.000000 | −0.195907e−01 | −0.714696e−01 | 0.000000e+00 | 0.000000e+00 |
| 3 | 0.658462 | 0.523468e−01 | 0.910964e−01 | 0.000000e+00 | 0.000000e+00 |
| 4 | −1.000000 | 0.488752e−01 | 0.204890e−01 | 0.000000e+00 | 0.000000e+00 |
| 5 | 1.000000 | 0.181949e−01 | −0.670647e−02 | 0.965643e−03 | 0.000000e+00 |
| 6 | 0.000000 | −0.448564e−01 | 0.962404e−02 | −0.176382e−02 | 0.123044e−03 |

Under such conditions, $r_1/f=0.334$, thereby satisfying the conditional expression (1). Also, $r_3/f=-0.232$, thereby satisfying the conditional expression (2). Further, $f/r_2=0.456$, thereby satisfying the conditional expression (3). Furthermore, $f/r_6=0.551$, thereby satisfying the conditional expression (4). Also, $\nu_1=55.8$, $\nu_2=27.0$, $\nu_3=55.8$ were achieved, thereby satisfying each of the conditional expressions (5) to (7).

Figure 3:
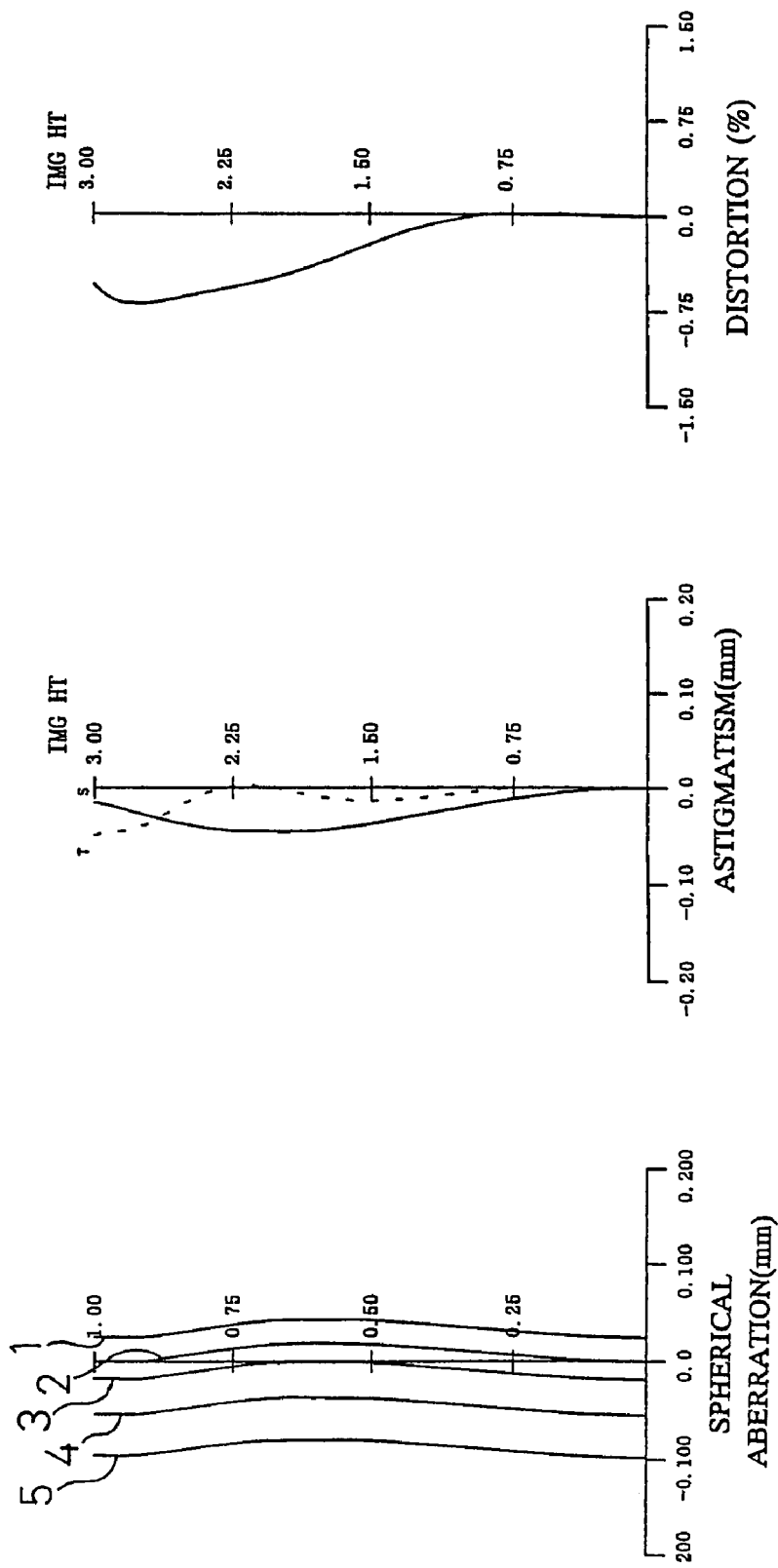
FIG. 3 is an explanatory illustration showing spherical aberration, astigmatism and distortion of the imaging lens system shown in FIG. 2.
Figure 4:
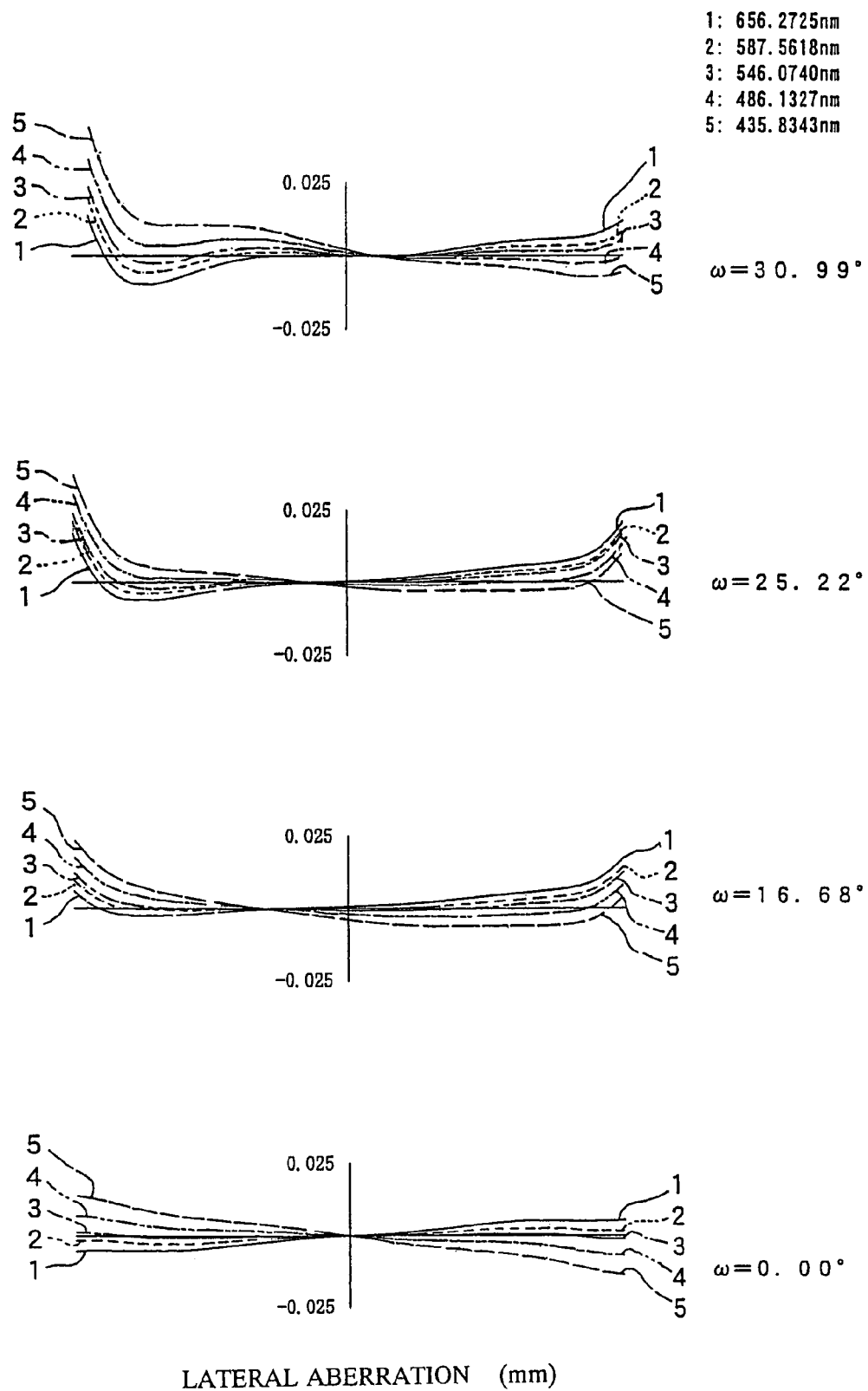
FIG. 4 is an explanatory illustration showing lateral aberration of the imaging lens system shown in FIG. 2.

FIG. 3 shows the spherical aberration, the astigmatism, and the distortion of the imaging lens system 4 of FIRST EXAMPLE and FIG. 4 shows the lateral aberration.

The spherical aberration, the astigmatism, the distortion and the lateral aberration were all satisfied. From the results, it can be seen that a sufficient optical property can be obtained.

Further, the entire length of the optical system can be set 6.23 mm, which is appropriate for reducing the size and weight in addition to obtaining such excellent optical properties.

Second Example

Figure 5:
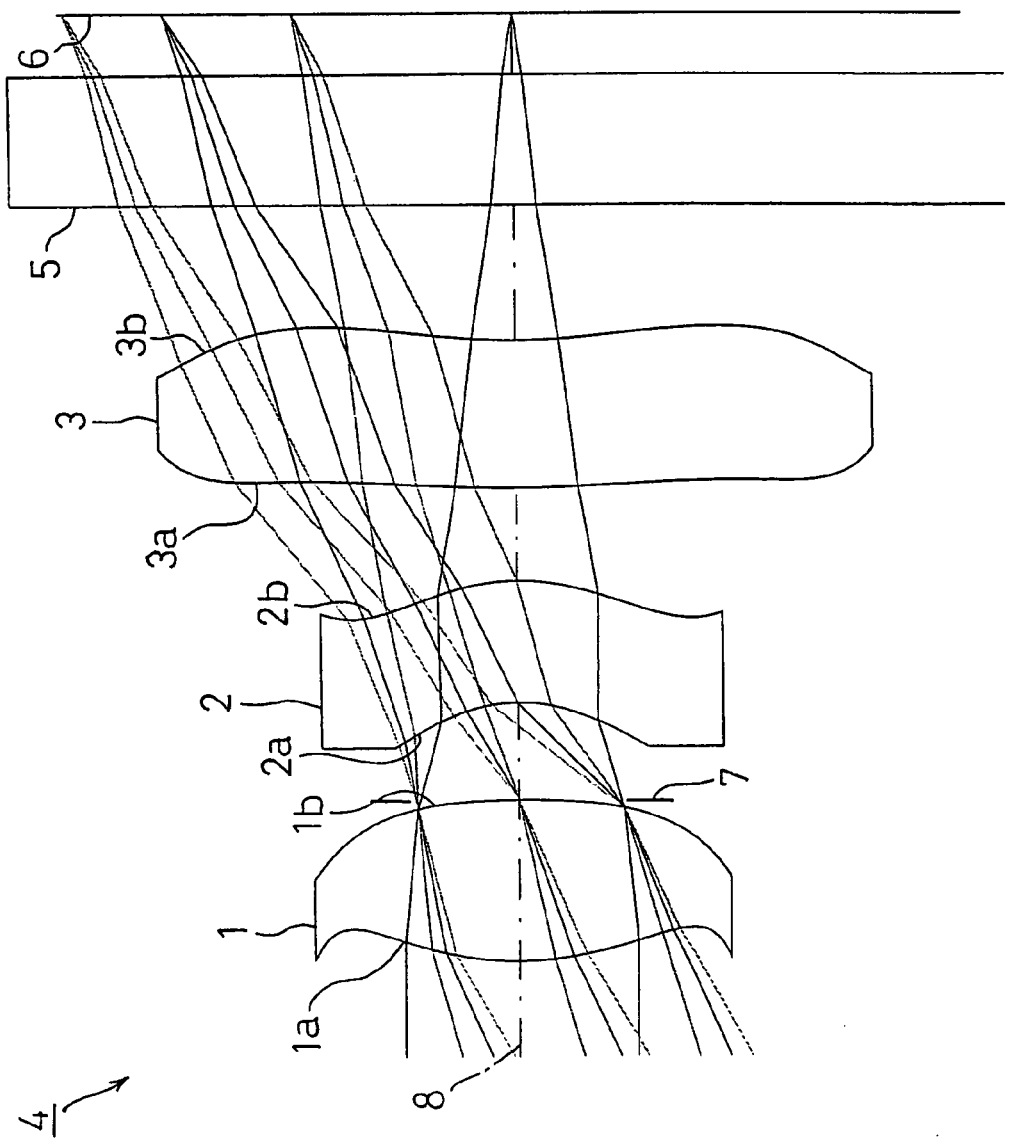
FIG. 5 is a schematic illustration showing SECOND EXAMPLE of an imaging lens system according to the present invention.

FIG. 5 shows SECOND EXAMPLE of the present invention. In the imaging lens system 4 shown in FIG. 5, the diaphragm 7 was also regarded as the same surface as the second face 1b of the first lens 1. Each of the first to third lenses 1, 2, 3 was formed using a resin material.

The imaging lens system 4 of SECOND EXAMPLE was set under the following conditions.

Under such conditions, $r_1/f=0.456$, thereby satisfying the conditional expression (1). Also, $r_3/f=-0.218$, thereby satisfying the conditional expression (2). Further, $f/r_2=-0.846$, thereby satisfying the conditional expression (3). Furthermore, $f/r_6=1.176$, thereby satisfying the conditional expression (4). Also, $\nu_1=55.8$, $\nu_2=27.0$, $\nu_3=55.8$ were achieved, thereby satisfying each of the conditional expressions (5) to (7).

Figure 6:
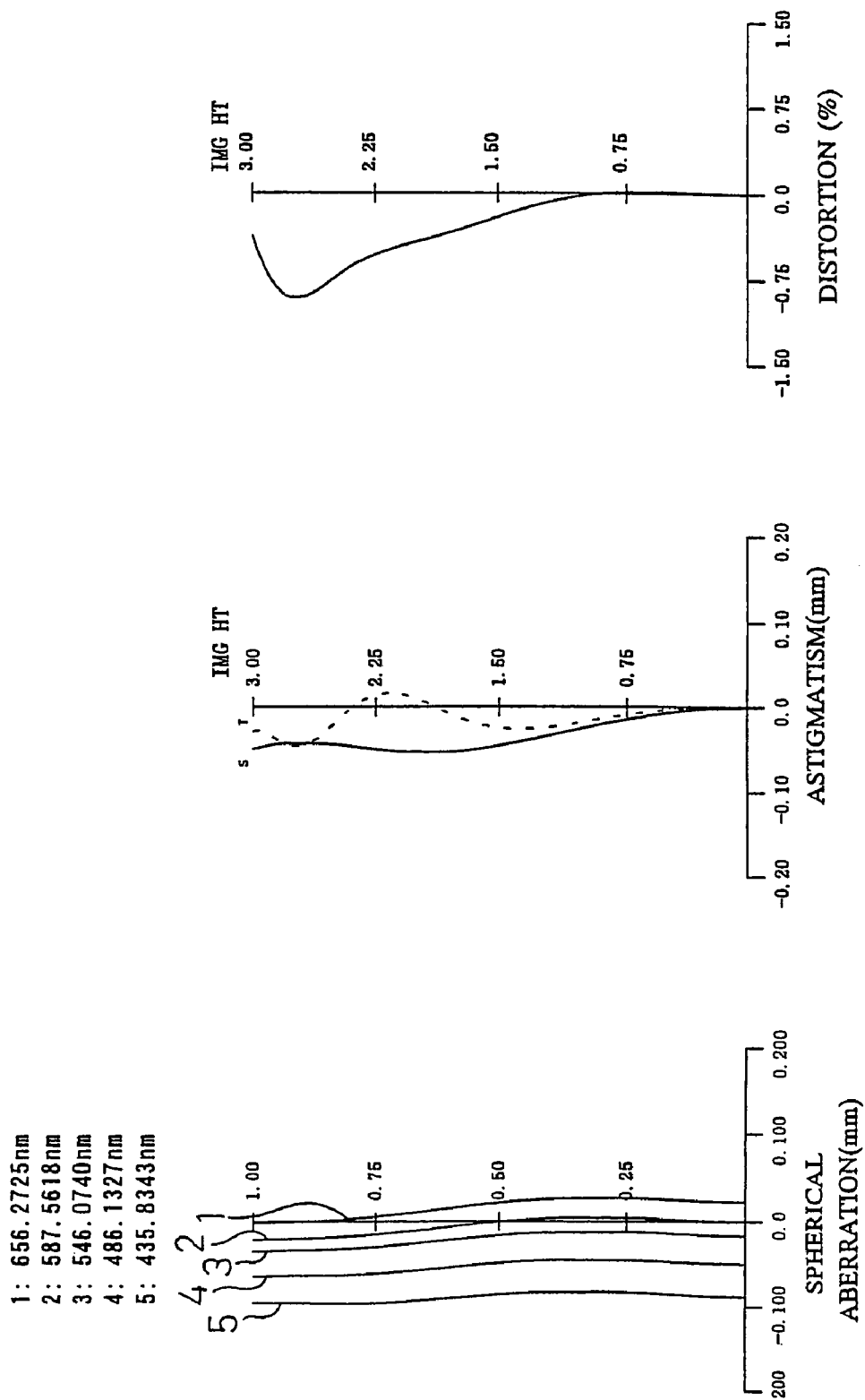
FIG. 6 is an explanatory illustration showing spherical aberration, astigmatism and distortion of the imaging lens system shown in FIG. 5.

FIG. 6 shows the spherical aberration, the astigmatism, and the distortion of the imaging lens system 4 of SECOND EXAMPLE and FIG. 7 shows the lateral aberration.

The spherical aberration, the astigmatism, the distortion, and the lateral aberration were all satisfied. From the results, it can be seen that a sufficient optical property can be obtained.

Further, the entire length of the optical system can be set 6.23 mm, which is appropriate for reducing the size and weight in addition to obtaining such excellent optical properties.

Third Example

Figure 8:
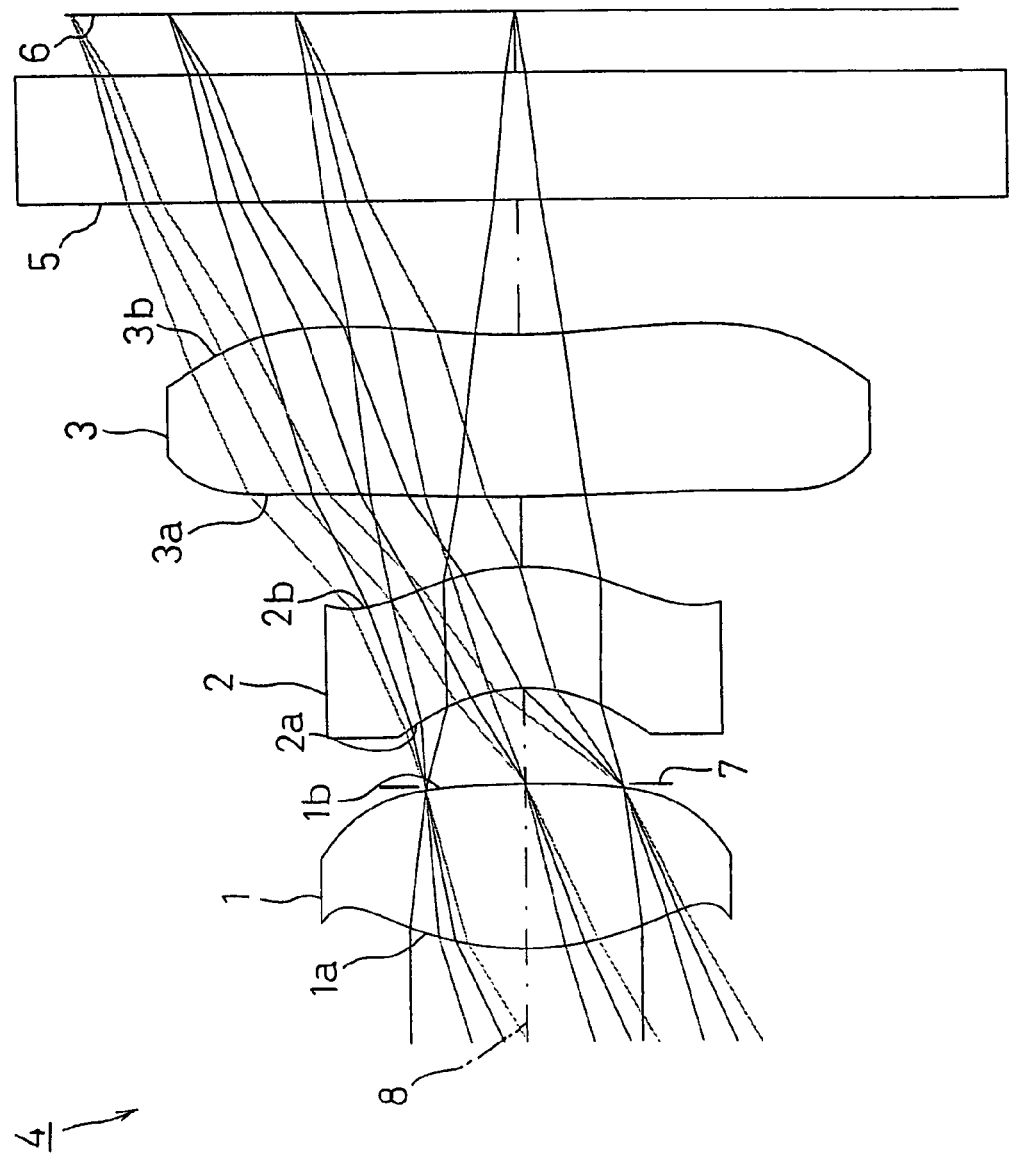
FIG. 8 is a schematic illustration showing THIRD EXAMPLE of an imaging lens system according to the present invention.

FIG. 8 shows THIRD EXAMPLE of the present invention. In the imaging lens system 4 shown in FIG. 8, the diaphragm 7 was regarded as the same surface as the second face 1b of the first lens 1 as in FIRST EXAMPLE. Also, each of the first to third lenses 1, 2, 3 was formed using a resin material.

The imaging lens system 4 of THIRD EXAMPLE was set under the following conditions.

(Lens Data)
f = 5.00 mm, F no = 3.18, ω = 31.04°

| Face Number | r | d | nd | νd |
|---|---|---|---|---|
| (Object Point) | ∞ | 1000.390 | | |
| 1 (First Face of First Lens) | 2.28150 | 1.061 | 1.5300 | 55.8 |
| 2 (Second Face of First Lens) (Diaphragm) | −5.90960 | 0.649 | | |
| 3 (First Face of Second Lens) | −1.09163 | 0.800 | 1.6070 | 27.0 |
| 4 (Second Face of Second Lens) | −1.48531 | 0.602 | | |
| 5 (First Face of Third Lens) | 11.91778 | 0.963 | 1.5300 | 55.8 |
| 6 (Second Face of Third Lens) | 4.25000 | 0.900 | | |
| 7 (First Face of Cover Glass) | ∞ | 0.850 | 1.5168 | 64.2 |
| 8 (Second Face of Cover Glass) | ∞ | 0.400 | | |
| (Image Surface) | ∞ | | | |

| Face No. | k | A | B | C | D |
|---|---|---|---|---|---|
| 1 | −11.416437 | 0.985518e−01 | −0.920520e−01 | 0.470655e−01 | −0.218362e−01 |
| 2 | 0.000000 | −0.541953e−01 | −0.190726e−01 | 0.000000e+00 | 0.000000e+00 |
| 3 | −0.162564 | 0.110760e+00 | 0.842276e−01 | 0.000000e+00 | 0.000000e+00 |
| 4 | −0.072024 | 0.104247e+00 | 0.445710e−01 | 0.000000e+00 | 0.000000e+00 |
| 5 | 1.000000 | −0.461473e−02 | −0.421017e−02 | 0.877457e−03 | 0.000000e+00 |
| 6 | 0.000000 | −0.525966e−01 | 0.109004e−01 | −0.220928e−02 | 0.176423e−03 |

(Lens Data)
f = 5.00 mm, F no = 3.18, ω = 31.02°

| Face Number | r | d | nd | νd |
|---|---|---|---|---|
| (Object Point) | ∞ | 1000.390 | | |
| 1 (First Face of First Lens) | 2.05569 | 1.102 | 1.5300 | 55.8 |
| 2 (Second Face of First Lens) (Diaphragm) | −10.08594 | 0.631 | | |
| 3 (First Face of Second Lens) | −1.10899 | 0.801 | 1.6070 | 27.0 |
| 4 (Second Face of Second Lens) | −1.47763 | 0.469 | | |
| 5 (First Face of Third Lens) | 18.23224 | 1.073 | 1.5300 | 55.8 |
| 6 (Second Face of Third Lens) | 5.00000 | 0.900 | | |
| 7 (First Face of Cover Glass) | ∞ | 0.850 | 1.5168 | 64.2 |
| 8 (Second Face of Cover Glass) | ∞ | 0.400 | | |
| (Image Surface) | ∞ | | | |

| Face No. | k | A | B | C | D |
|---|---|---|---|---|---|
| 1 | −8.996077 | 0.115404e+00 | −0.895886e−01 | 0.482837e−01 | −0.206340e−01 |
| 2 | 0.000000 | −0.472860e−01 | −0.272533e−01 | 0.000000e+00 | 0.000000e+00 |
| 3 | 0.033119 | 0.999234e−01 | 0.943302e−01 | 0.000000e+00 | 0.000000e+00 |
| 4 | −0.068860 | 0.101111e+00 | 0.440761e−01 | 0.000000e+00 | 0.000000e+00 |
| 5 | 1.000000 | −0.941121e−04 | −0.464122e−02 | 0.922754e−03 | 0.000000e+00 |
| 6 | 0.000000 | −0.505948e−01 | 0.107551e−01 | −0.216430e−02 | 0.168479e−03 |

Under such conditions, $r_1/f=0.411$, thereby satisfying the conditional expression (1). Also, $r_3/f=-0.222$, thereby satisfying the conditional expression (2). Further, $f/r_2=-0.496$, thereby satisfying the conditional expression (3). Furthermore, $f/r_6=1.000$, thereby satisfying the conditional expression (4). Also, $v_1=55.8$, $v_2=27.0$, $v_3=55.8$ were achieved, thereby satisfying each of the conditional expressions (5) to (7).

Figure 9:
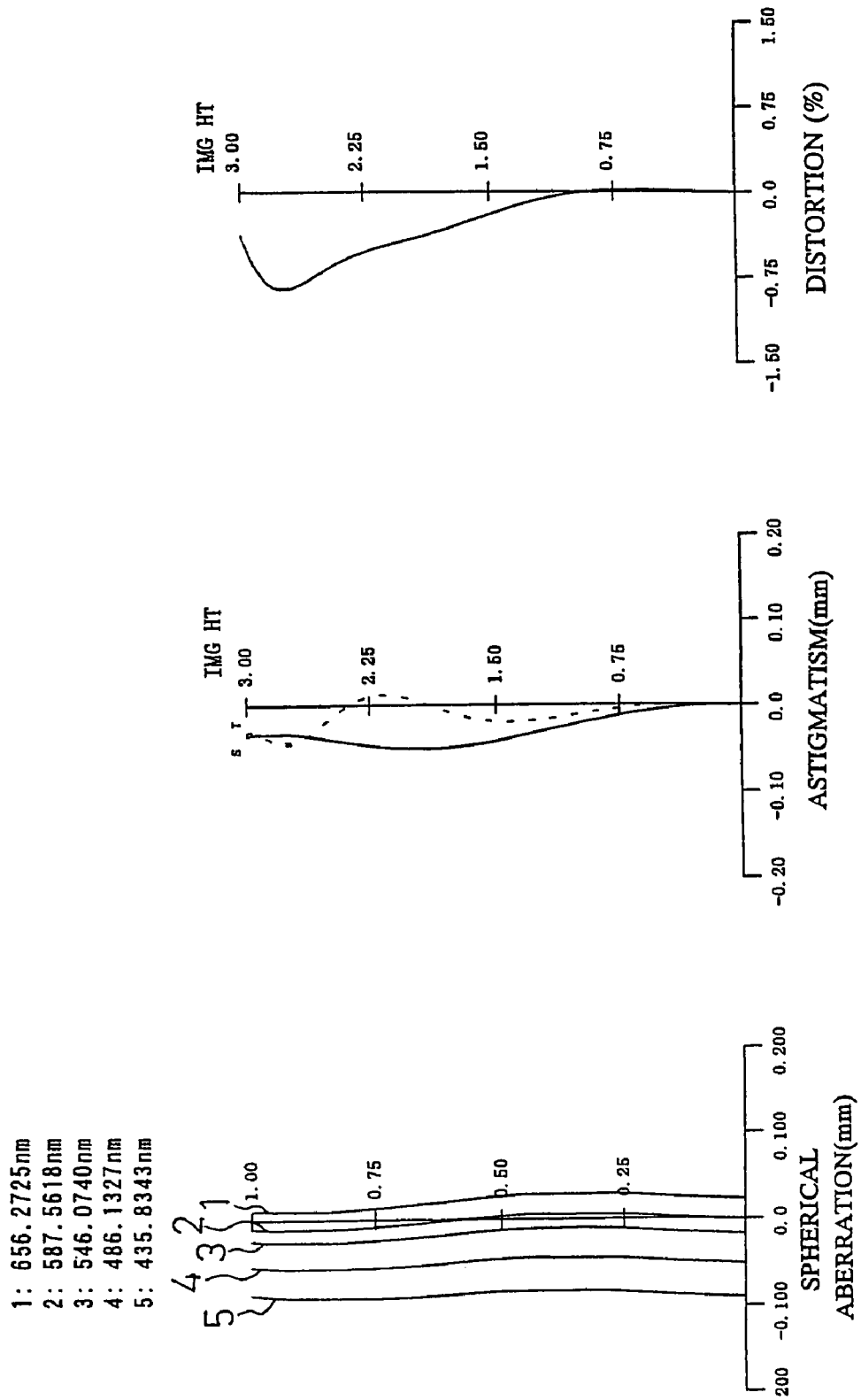
FIG. 9 is an explanatory illustration showing spherical aberration, astigmatism and distortion of the imaging lens system shown in FIG. 8.
Figure 10:
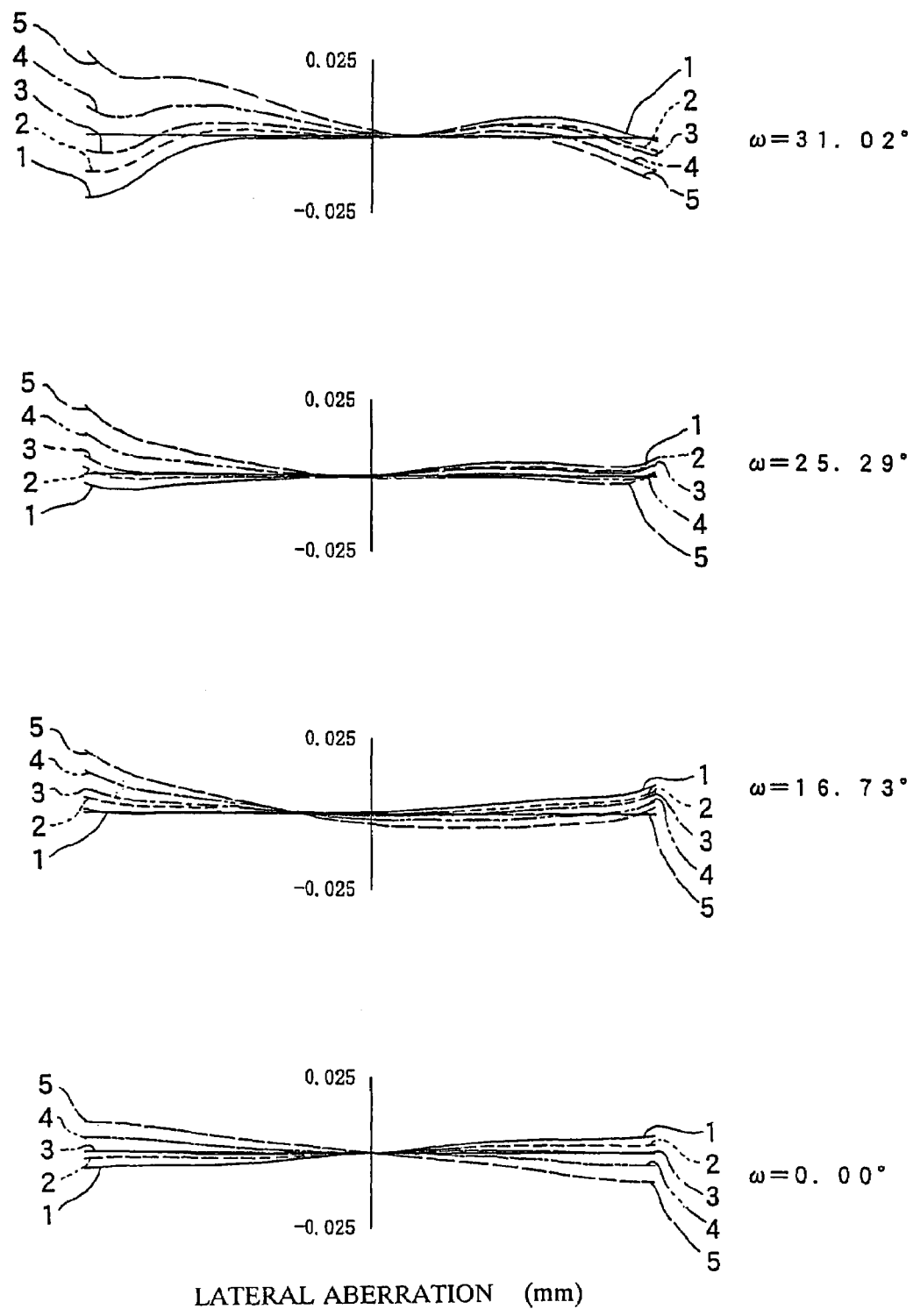
FIG. 10 is an explanatory illustration showing lateral aberration of the imaging lens system shown in FIG. 8.

FIG. 9 shows the spherical aberration, the astigmatism, and the distortion of the imaging lens system 4 of THIRD EXAMPLE and FIG. 10 shows the lateral aberration.

The spherical aberration, the astigmatism, the distortion, and the lateral aberration were all satisfied. From the results, it can be seen that a sufficient optical property can be obtained.

Further, the entire length of the optical system can be set 6.23 mm, which is appropriate for reducing the size and weight in addition to obtaining such excellent optical properties.

Fourth Example

Figure 11:
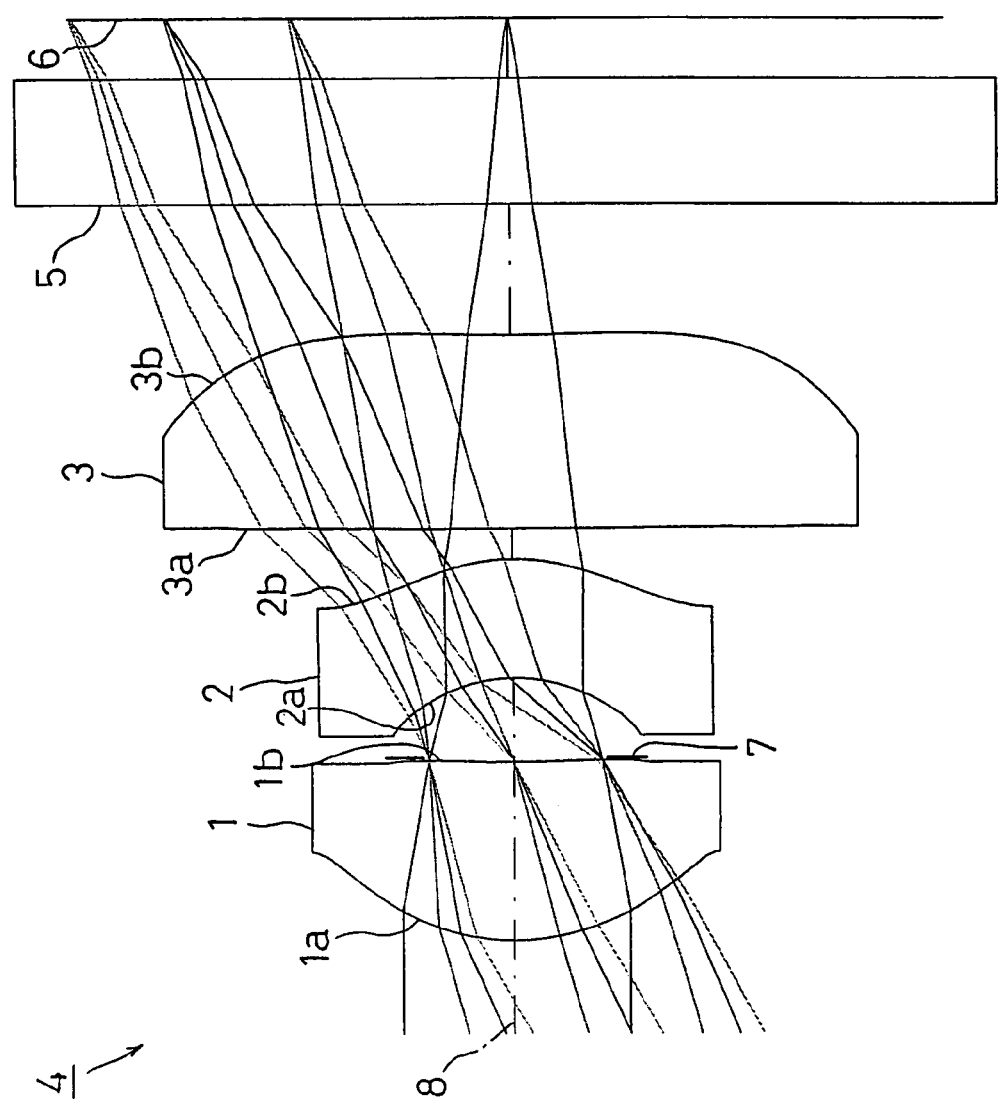
FIG. 11 is a schematic illustration showing FOURTH EXAMPLE of an imaging lens system according to the present invention.

FIG. 11 shows FOURTH EXAMPLE of the present invention. In the imaging lens system 4 shown in FIG. 11, the diaphragm 7 was also regarded as the same surface as the second face 1b of the first lens 1 as in FIRST EXAMPLE. Also, each of the first to third lenses 1, 2, 3 was formed using a resin material.

The imaging lens system 4 of FOURTH EXAMPLE was set under the following conditions.

(Lens Data)
f = 5.00 mm, F no = 3.18, ω = 30.92°

| Face Number | r | d | nd | νd |
|---|---|---|---|---|
| (Object Point) | ∞ | 1000.390 | | |
| 1 (First Face of First Lens) | 1.64744 | 1.207 | 1.5300 | 55.8 |
| 2 (Second Face of First Lens) (Diaphragm) | 10.28699 | 0.573 | | |
| 3 (First Face of Second Lens) | −1.15915 | 0.800 | 1.6070 | 27.0 |
| 4 (Second Face of Second Lens) | −1.50008 | 0.205 | | |
| 5 (First Face of Third Lens) | −109.68617 | 1.291 | 1.5300 | 55.8 |
| 6 (Second Face of Third Lens) | 12.49999 | 0.900 | | |
| 7 (First Face of Cover Glass) | ∞ | 0.850 | 1.5168 | 64.2 |
| 8 (Second Face of Cover Glass) | ∞ | 0.400 | | |
| (Image Surface) | ∞ | | | |

| Face No. | k | A | B | C | D |
|---|---|---|---|---|---|
| 1 | −6.440748 | 0.175544e+00 | −0.109777e+00 | 0.710343e−01 | −0.230266e−01 |
| 2 | 0.000000 | −0.174128e−01 | −0.591052e−01 | 0.000000e+00 | 0.000000e+00 |
| 3 | 0.637797 | 0.683283e−01 | 0.960848e−01 | 0.000000e+00 | 0.000000e+00 |
| 4 | −0.142084 | 0.850229e−01 | 0.300269e−01 | 0.000000e+00 | 0.000000e+00 |
| 5 | −0.016641 | 0.139262e−01 | −0.659669e−02 | 0.900553e−03 | 0.000000e+00 |
| 6 | 0.000000 | −0.399889e−01 | 0.721286e−02 | −0.130664e−02 | 0.768978e−04 |

Under such conditions, $r_1/f=0.329$, thereby satisfying the conditional expression (1). Also, $r_3/f=-0.232$, thereby satisfying the conditional expression (2). Further, $f/r_2=0.486$, thereby satisfying the conditional expression (3). Furthermore, $f/r_6=0.400$, thereby satisfying the conditional expression (4). Also, $\nu_1=55.8$, $\nu_2=27.0$, $\nu_3=55.8$ were achieved, thereby satisfying each of the conditional expressions (5) to (7).

Figure 12:
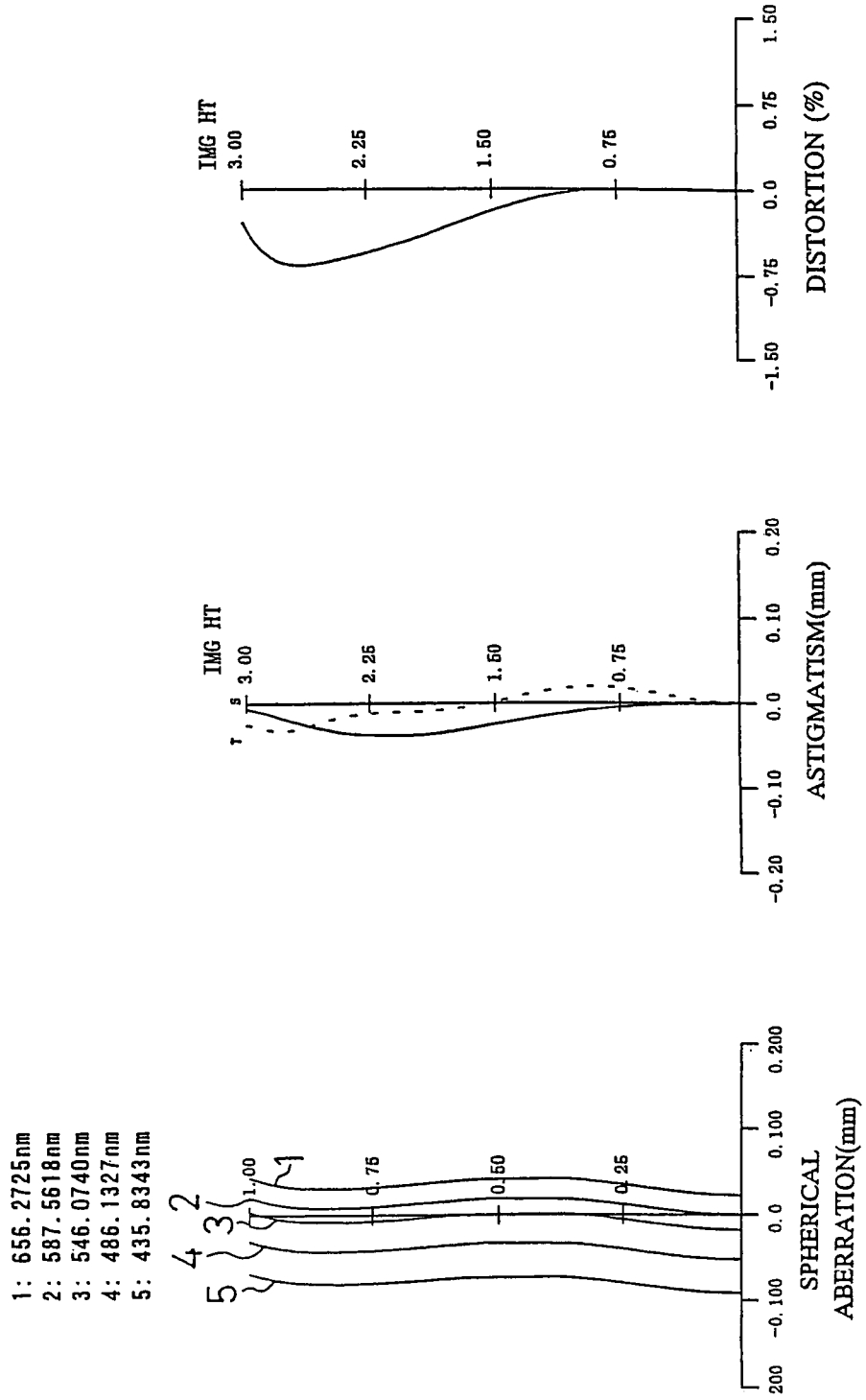
FIG. 12 is an explanatory illustration showing spherical aberration, astigmatism and distortion of the imaging lens system shown in FIG. 11.

FIG. 12 shows the spherical aberration, the astigmatism, and the distortion of the imaging lens system 4 of FOURTH EXAMPLE and FIG. 13 shows the lateral aberration.

The spherical aberration, the astigmatism, the distortion, and the lateral aberration were all satisfied. From the results, it can be seen that a sufficient optical property can be obtained.

Further, the entire length of the optical system can be set 6.23 mm, which is appropriate for reducing the size and weight in addition to obtaining such excellent optical properties.

Fifth Example

Figure 14:
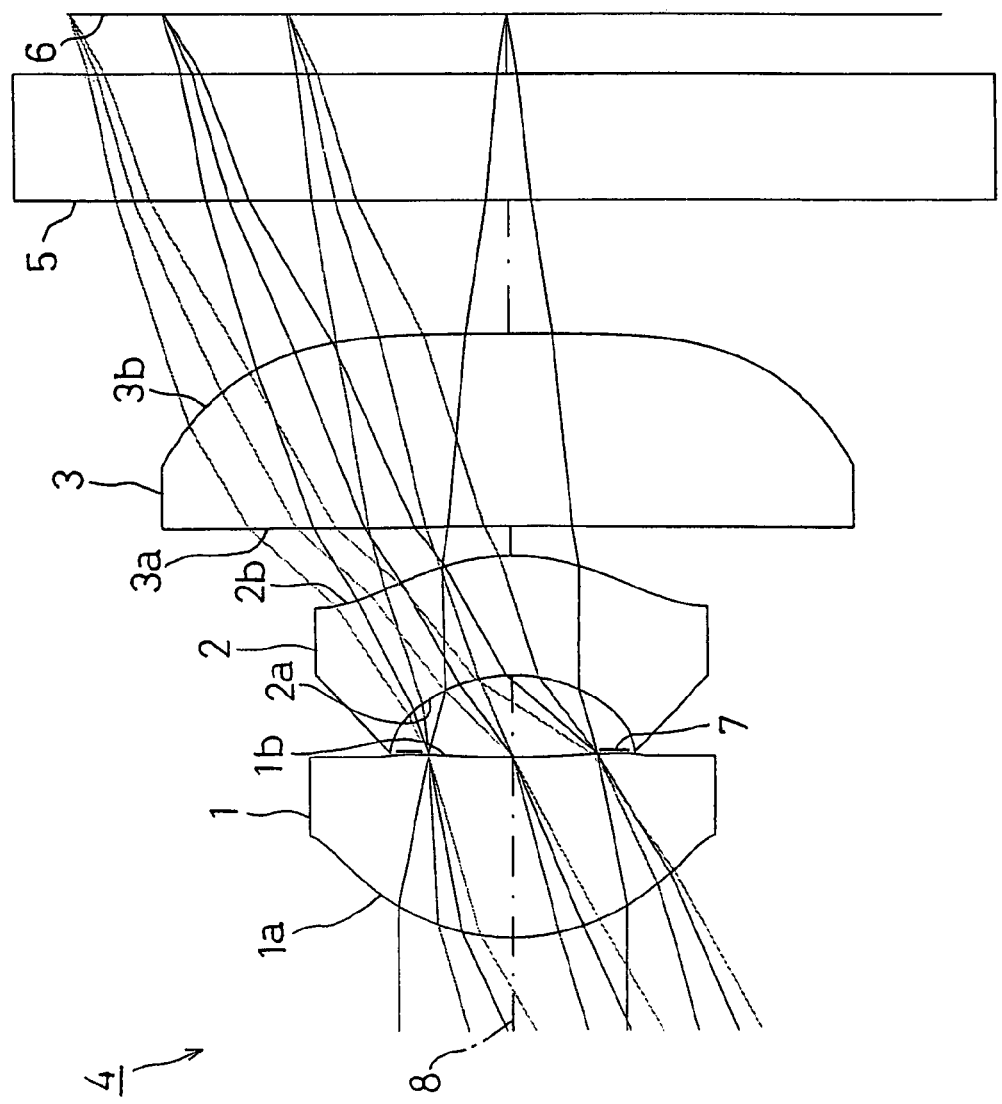
FIG. 14 is a schematic illustration showing FIFTH EXAMPLE of an imaging lens system according to the present invention.

FIG. 14 shows FIFTH EXAMPLE of the present invention. In the imaging lens system 4 shown in FIG. 14, the diaphragm 7 was also regarded as the same surface as the second face 1b of the first lens 1 as in FIRST EXAMPLE. Also, each of the first to third lenses 1, 2, 3 was formed using a resin material.

The imaging lens system 4 of FIFTH EXAMPLE was set under the following conditions.

Under such conditions, $r_1/f=0.309$, thereby satisfying the conditional expression (1). Also, $r_3/f=-0.222$, thereby satisfying the conditional expression (2). Further, $f/r_2=0.750$, thereby satisfying the conditional expression (3). Furthermore, $f/r_6=0.000$, thereby satisfying the conditional expression (4). Also, $\nu_1=55.8$, $\nu_2=27.0$, $\nu_3=55.8$ were achieved, thereby satisfying each of the conditional expressions (5) to (7).

Figure 15:
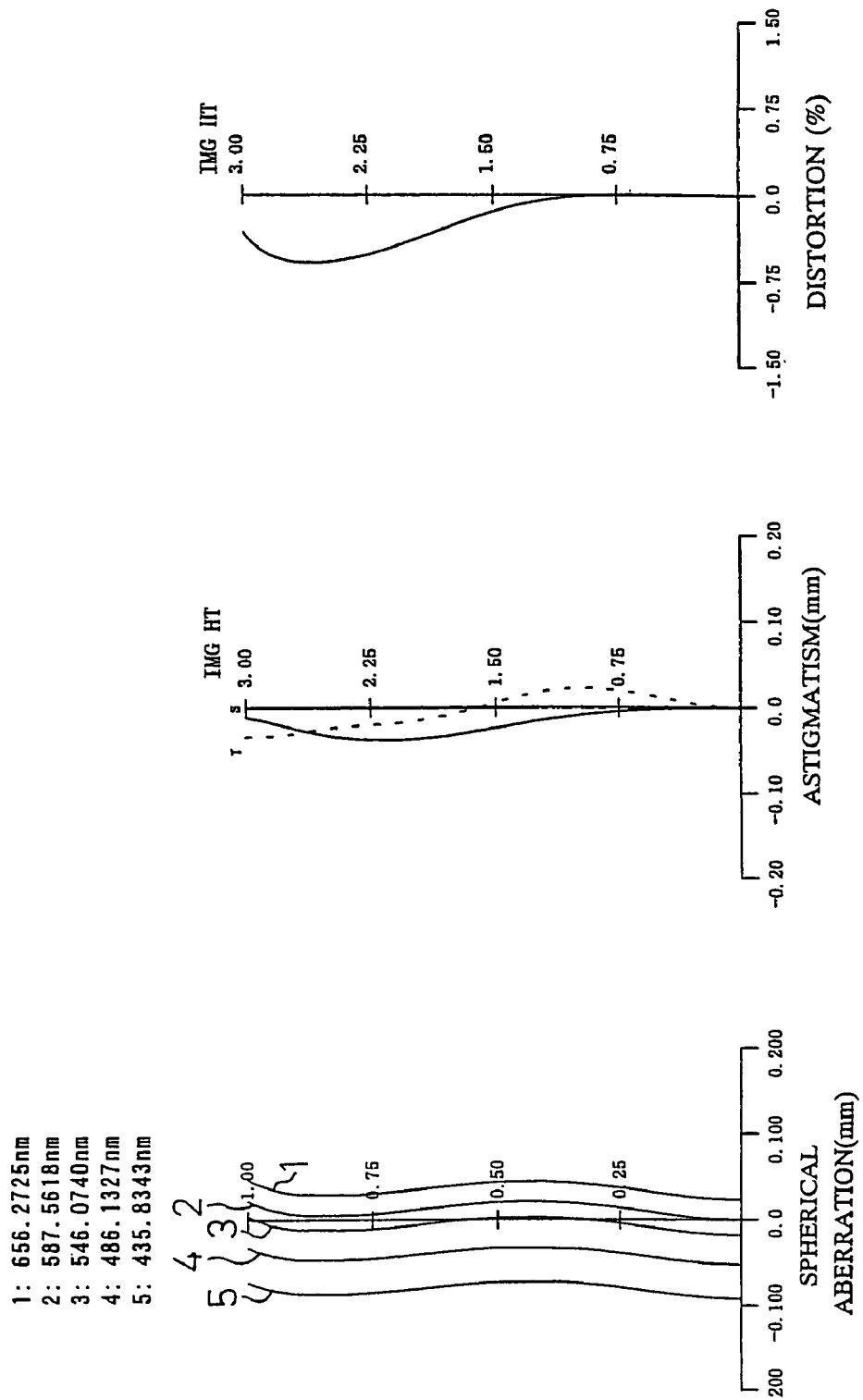
FIG. 15 is an explanatory illustration showing spherical aberration, astigmatism and distortion of the imaging lens system shown in FIG. 14.
Figure 16:
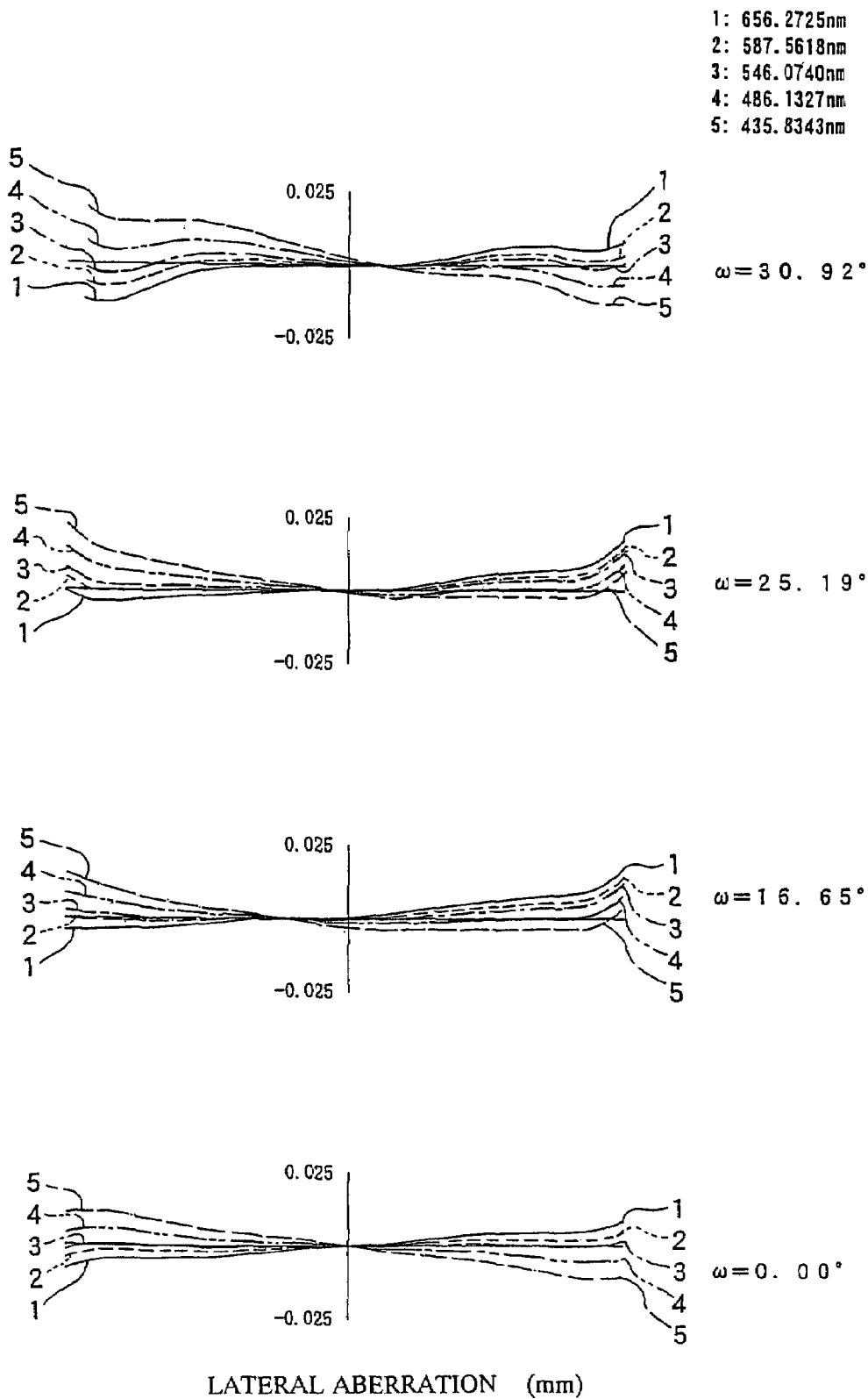
FIG. 16 is an explanatory illustration showing lateral aberration of the imaging lens system shown in FIG. 14.

FIG. 15 shows the spherical aberration, the astigmatism, and the distortion of the imaging lens system 4 of FIFTH EXAMPLE and FIG. 16 shows the lateral aberration.

The spherical aberration, the astigmatism, the distortion, and the lateral aberration were all satisfied. From the results, it can be seen that a sufficient optical property can be obtained.

Further, the entire length of the optical system can be set 6.23 mm, which is appropriate for reducing the size and weight in addition to obtaining such excellent optical properties.

Sixth Example

Figure 17:
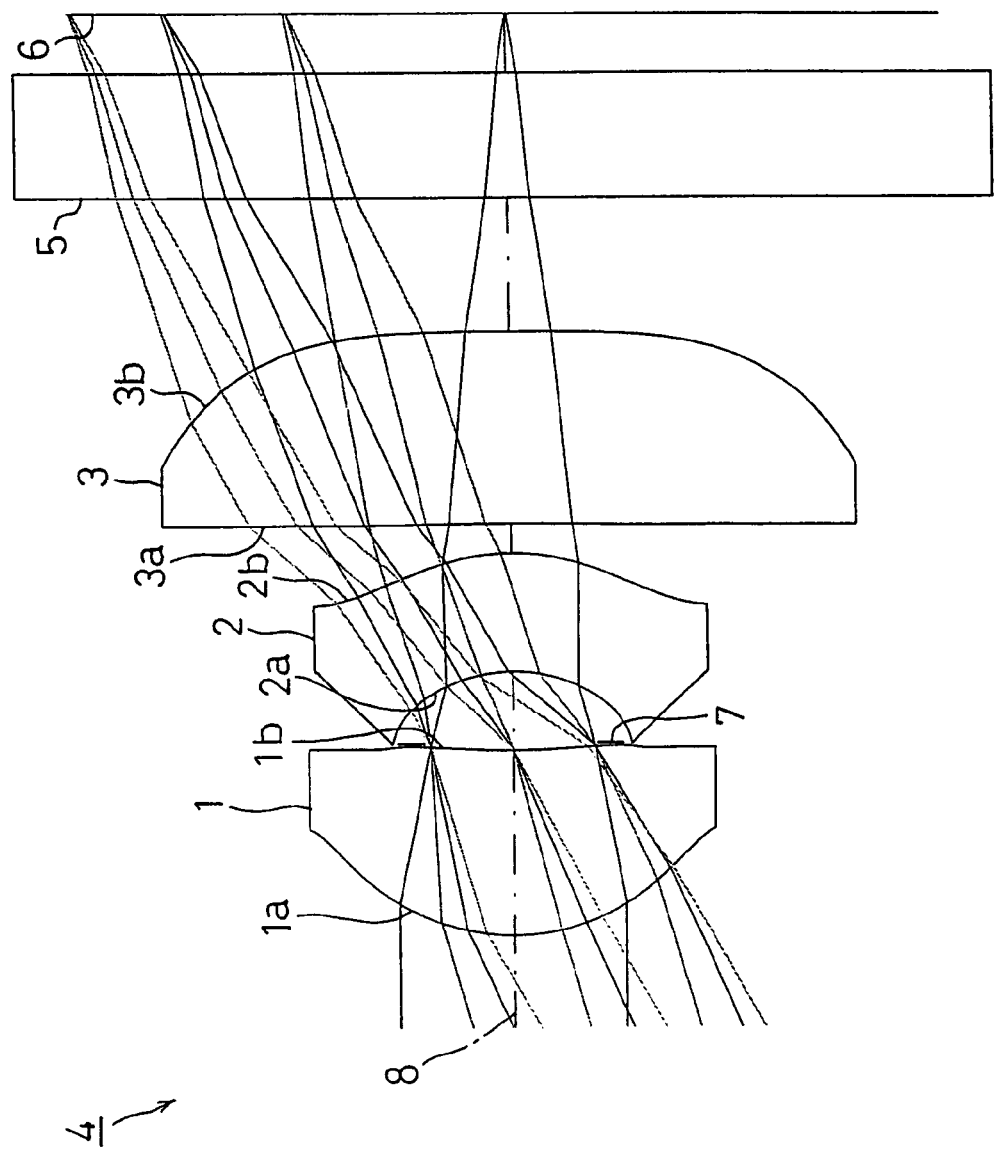
FIG. 17 is a schematic illustration showing SIXTH EXAMPLE of an imaging lens system according to the present invention.

FIG. 17 shows SIXTH EXAMPLE of the present invention. In the imaging lens system 4 shown in FIG. 17, the diaphragm 7 was also regarded as the same surface as the second face 1b of the first lens 1 as in FIRST EXAMPLE. Also, each of the first to third lenses 1, 2, 3 was formed using a resin material.

The imaging lens system 4 of SIXTH EXAMPLE was set under the following conditions.

(Lens Data)
f = 5.00 mm, F no = 3.18, ω = 30.92°

| Face Number | r | d | nd | νd |
|---|---|---|---|---|
| (Object Point) | ∞ | 1000.390 | | |
| 1 (First Face of First Lens) | 1.54728 | 1.229 | 1.5300 | 55.8 |
| 2 (Second Face of First Lens) (Diaphragm) | 6.66474 | 0.551 | | |
| 3 (First Face of Second Lens) | −1.11137 | 0.800 | 1.6070 | 27.0 |
| 4 (Second Face of Second Lens) | −1.47267 | 0.200 | | |
| 5 (First Face of Third Lens) | −20.41203 | 1.296 | 1.5300 | 55.8 |
| 6 (Second Face of Third Lens) | ∞ | 0.900 | | |
| 7 (First Face of Cover Glass) | ∞ | 0.850 | 1.5168 | 64.2 |
| 8 (Second Face of Cover Glass) | ∞ | 0.400 | | |
| (Image Surface) | ∞ | | | |

| Face No. | k | A | B | C | D |
|---|---|---|---|---|---|
| 1 | −5.924571 | 0.196695e+00 | −0.121345e+00 | 0.824610e−01 | −0.260731e−01 |
| 2 | 0.000000 | −0.138372e−01 | −0.819064e−01 | 0.000000e+00 | 0.000000e+00 |
| 3 | 0.730294 | 0.457223e−01 | 0.122159e+00 | 0.000000e+00 | 0.000000e+00 |
| 4 | −0.172690 | 0.708335e−01 | 0.356215e−01 | 0.000000e+00 | 0.000000e+00 |
| 5 | −0.039852 | 0.190096e−01 | −0.597232e−02 | 0.641380e−03 | 0.000000e+00 |
| 6 | 0.000000 | −0.314382e−01 | 0.353187e−02 | −0.476274e−03 | −0.400459e−06 |

(Lens Data)
f = 5.00 mm, F no = 3.18, ω = 30.86°

| Face Number | r | d | nd | vd |
|---|---|---|---|---|
| (Object Point) | ∞ | 1000.390 | | |
| 1 (First Face of First Lens) | 1.53048 | 1.260 | 1.5300 | 55.8 |
| 2 (Second Face of First Lens) (Diaphragm) | 6.09086 | 0.527 | | |
| 3 (First Face of Second Lens) | −1.11601 | 0.800 | 1.6070 | 27.0 |
| 4 (Second Face of Second Lens) | −1.49663 | 0.200 | | |
| 5 (First Face of Third Lens) | −22.52461 | 1.288 | 1.5300 | 55.8 |
| 6 (Second Face of Third Lens) | −99.99998 | 0.900 | | |
| 7 (First Face of Cover Glass) | ∞ | 0.850 | 1.5168 | 64.2 |
| 8 (Second Face of Cover Glass) | ∞ | 0.400 | | |
| (Image Surface) | ∞ | | | |

| Face No. | k | A | B | C | D |
|---|---|---|---|---|---|
| 1 | −5.860215 | 0.200935e+00 | −0.123497e+00 | 0.851413e−01 | −0.262823e−01 |
| 2 | 0.000000 | −0.111427e−01 | −0.888509e−01 | 0.000000e+00 | 0.000000e+00 |
| 3 | 0.806094 | 0.457779e−01 | 0.114735e+00 | 0.000000e+00 | 0.000000e+00 |
| 4 | −0.147545 | 0.659958e−01 | 0.344894e−01 | 0.000000e+00 | 0.000000e+00 |
| 5 | −0.039852 | 0.169721e−01 | −0.527125e−02 | 0.559453e−03 | 0.000000e+00 |
| 6 | 0.000000 | −0.297831e−01 | 0.293144e−02 | −0.382887e−03 | −0.350062e−05 |

Under such conditions, $r_1/f = 0.306$, thereby satisfying the conditional expression (1). Also, $r_3/f = -0.223$, thereby satisfying the conditional expression (2). Further, $f/r_2 = 0.821$, thereby satisfying the conditional expression (3). Furthermore, $f/r_6 = 0.050$, thereby satisfying the conditional expression (4). Also, $\nu_1 = 55.8$, $\nu_2 = 27.0$, $\nu_3 = 55.8$ were achieved, thereby satisfying each of the conditional expressions (5) to (7).

Figure 18:
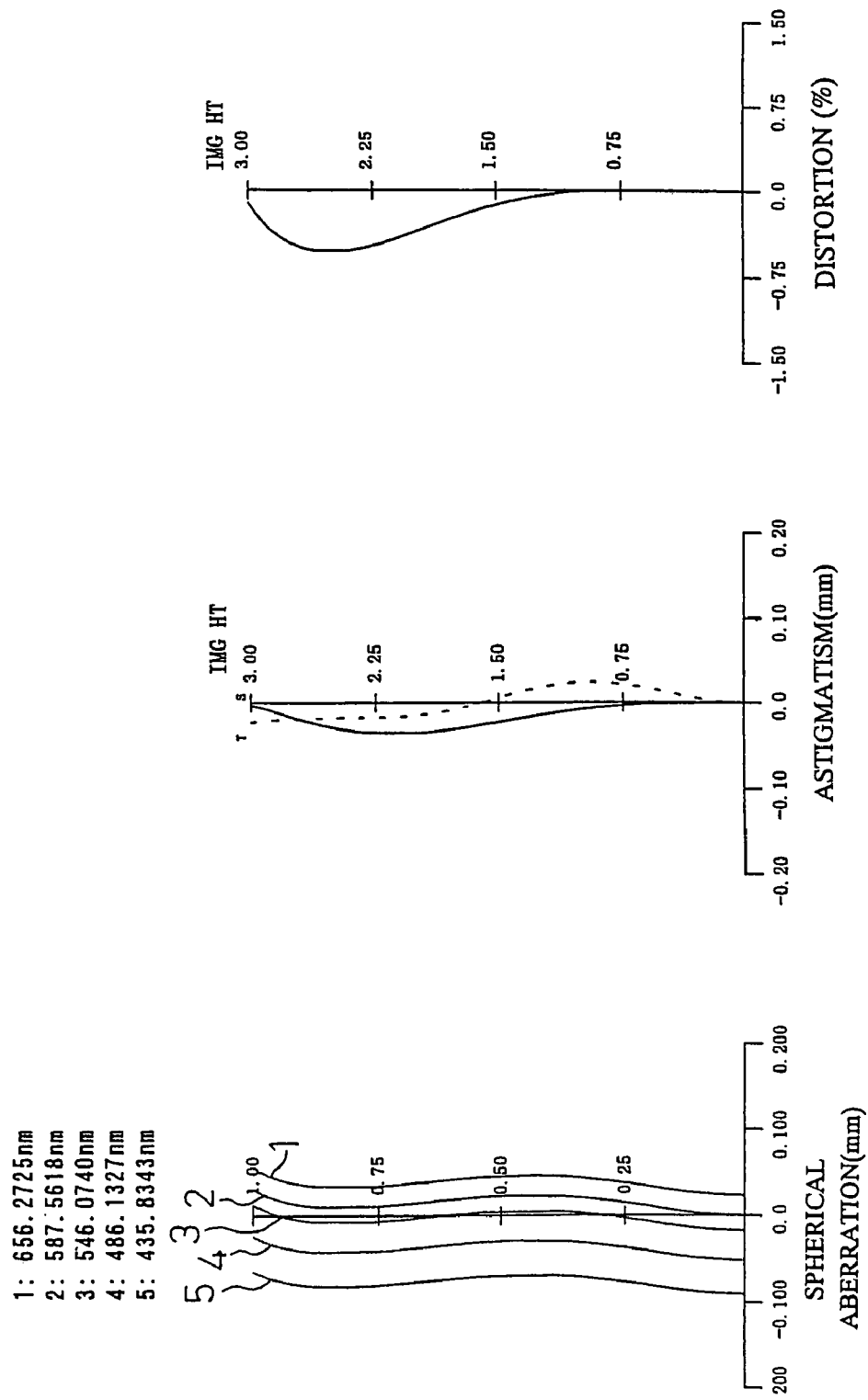
FIG. 18 is an explanatory illustration showing spherical aberration, astigmatism and distortion of the imaging lens system shown in FIG. 17.

FIG. 18 shows the spherical aberration, the astigmatism, and the distortion of the imaging lens system 4 of SIXTH EXAMPLE and FIG. 19 shows the lateral aberration.

The spherical aberration, the astigmatism, the distortion, and the lateral aberration were all satisfied. From the results, it can be seen that a sufficient optical property can be obtained.

Further, the entire length of the optical system can be set 6.23 mm, which is appropriate for reducing the size and weight in addition to obtaining such excellent optical properties.

Seventh Example

Figure 20:
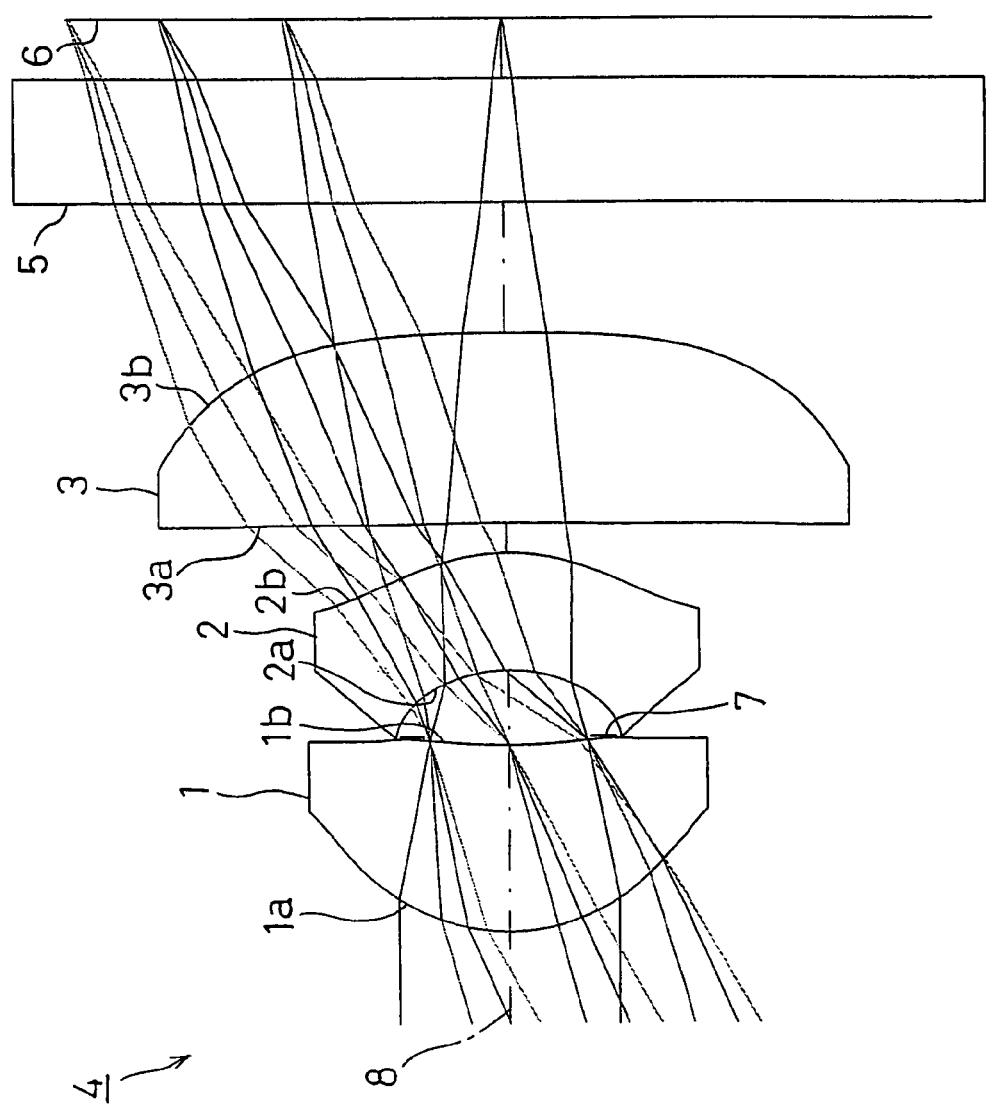
FIG. 20 is a schematic illustration showing SEVENTH EXAMPLE of an imaging lens system according to the present invention.

FIG. 20 shows SEVENTH EXAMPLE of the present invention. In the imaging lens system 4 shown in FIG. 20, the diaphragm 7 was also regarded as the same surface as the second face 1b of the first lens 1 as in FIRST EXAMPLE. Also, each of the first to third lenses 1, 2, 3 was formed using a resin material.

Further, the imaging lens system 4 of SEVENTH EXAMPLE was set under the following conditions.

(Lens Data)
f = 5.00 mm, F no = 3.18, ω = 30.84°

| Face Number | r | d | nd | vd |
|---|---|---|---|---|
| (Object Point) | ∞ | 1000.390 | | |
| 1 (First Face of First Lens) | 1.48974 | 1.277 | 1.5300 | 55.8 |
| 2 (Second Face of First Lens) (Diaphragm) | 4.83403 | 0.514 | | |
| 3 (First Face of Second Lens) | −1.14201 | 0.800 | 1.6070 | 27.0 |
| 4 (Second Face of Second Lens) | −1.54616 | 0.200 | | |
| 5 (First Face of Third Lens) | −22.65312 | 1.284 | 1.5300 | 55.8 |
| 6 (Second Face of Third Lens) | −25.01727 | 0.900 | | |
| 7 (First Face of Cover Glass) | ∞ | 0.850 | 1.5168 | 64.2 |
| 8 (Second Face of Cover Glass) | ∞ | 0.400 | | |
| (Image Surface) | ∞ | | | |

| Face No. | k | A | B | C | D |
|---|---|---|---|---|---|
| 1 | −5.779241 | 0.213294e+00 | −0.128524e+00 | 0.879448e−01 | −0.248972e−01 |
| 2 | 0.000000 | −0.175741e−02 | −0.939520e−01 | 0.000000e+00 | 0.000000e+00 |
| 3 | 1.024612 | 0.395688e−01 | 0.109435e+00 | 0.000000e+00 | 0.000000e+00 |
| 4 | −0.100907 | 0.536528e−01 | 0.302046e−01 | 0.000000e+00 | 0.000000e+00 |
| 5 | −0.090000 | 0.156680e−01 | −0.433357e−02 | 0.369434e−03 | 0.000000e+00 |
| 6 | 0.000000 | −0.246223e−01 | 0.155044e−02 | −0.147133e−03 | −0.196292e−04 |

Under such conditions, $r_1/f = 0.298$, thereby satisfying the conditional expression (1). Also, $r_3/f=-0.228$, thereby satisfying the conditional expression (2). Further, $f/r_2=1.034$, thereby satisfying the conditional expression (3). Furthermore, $f/r_6=-0.200$, thereby satisfying the conditional expression (4). Also, $v_1=55.8$, $v_2=27.0$, $v_3=55.8$ were achieved, thereby satisfying each of the conditional expressions (5) to (7).

Figure 21:
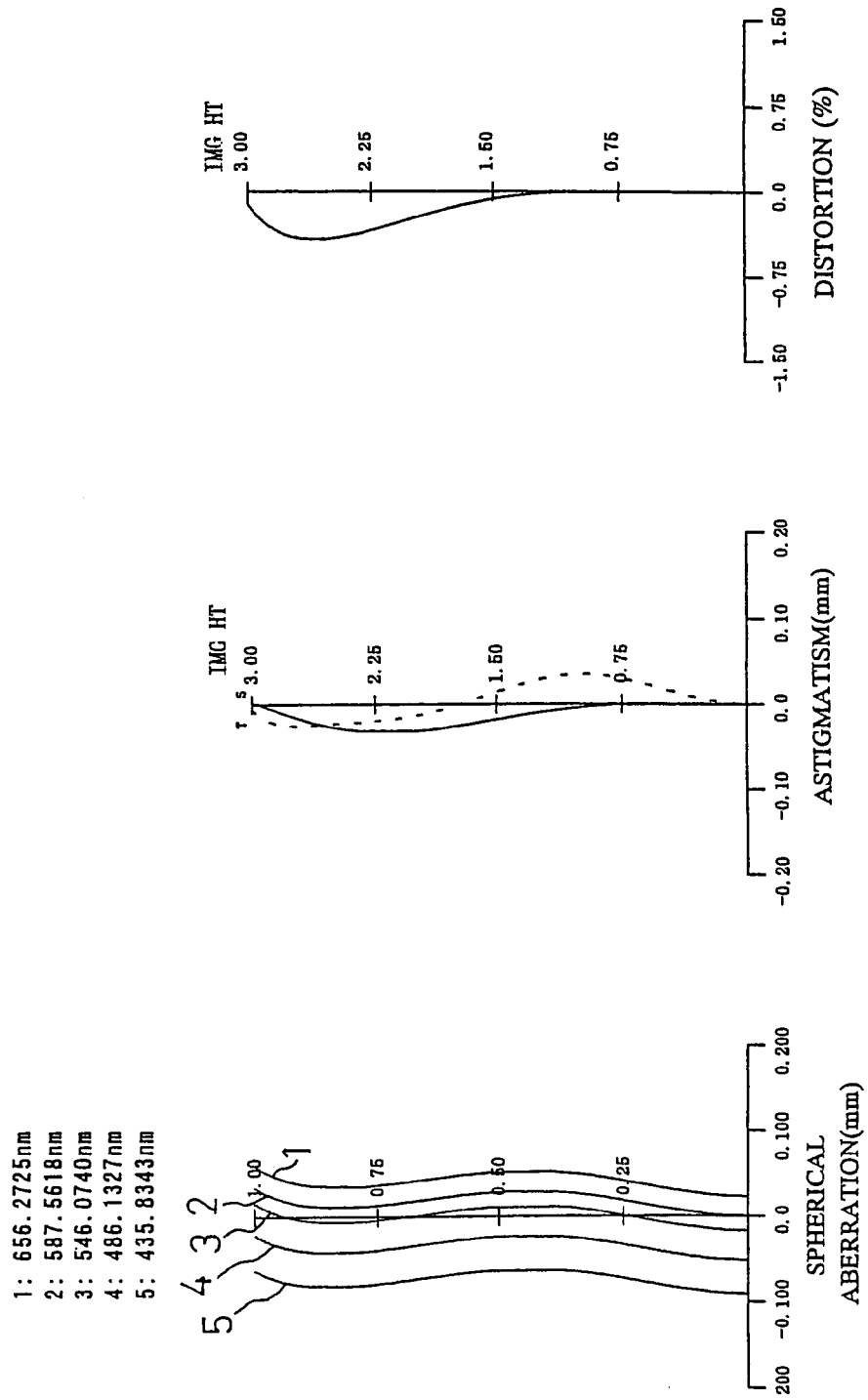
FIG. 21 is an explanatory illustration showing spherical aberration, astigmatism and distortion of the imaging lens system shown in FIG. 20.
Figure 22:
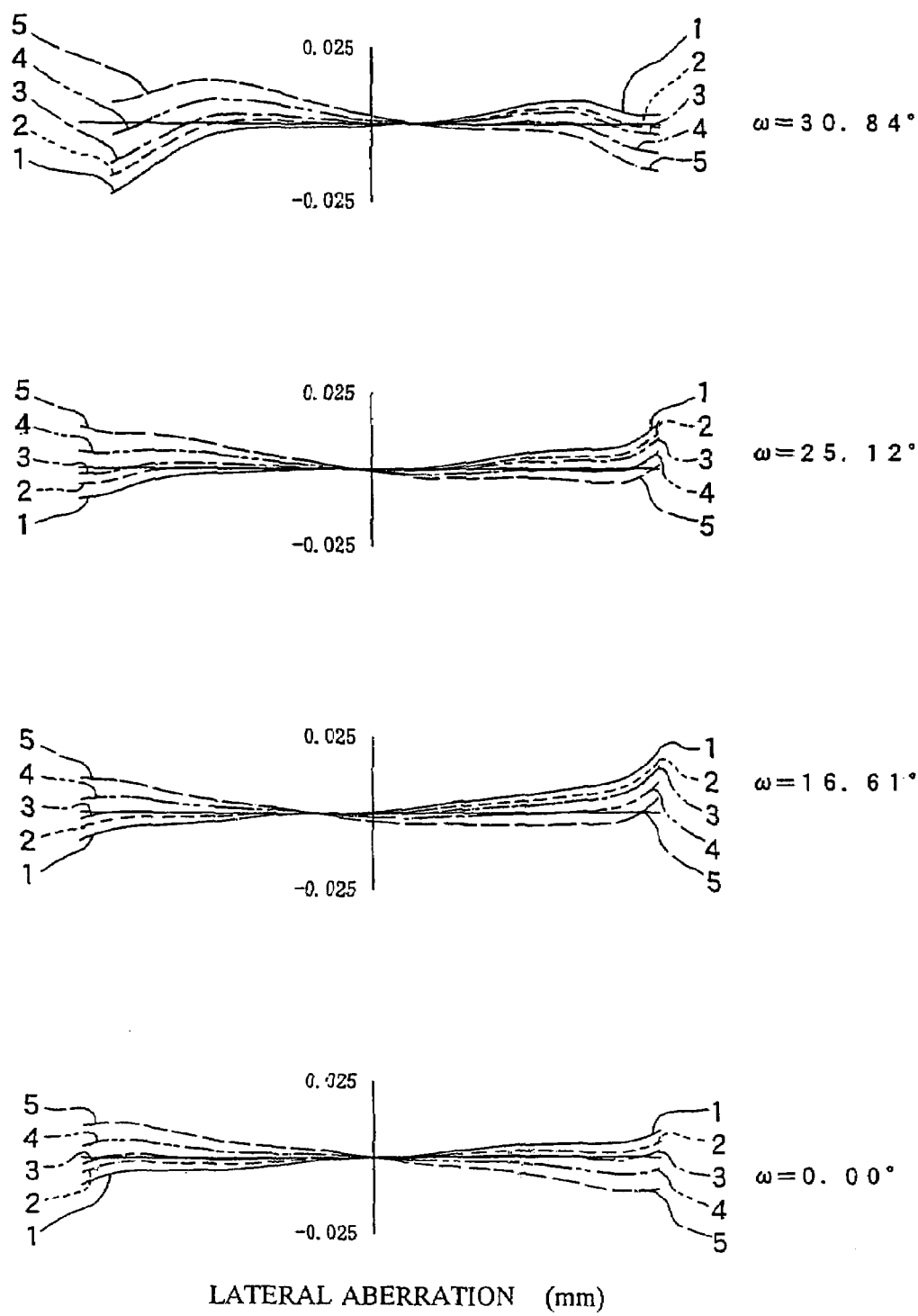
FIG. 22 is an explanatory illustration showing lateral aberration of the imaging lens system shown in FIG. 20.

FIG. 21 shows the spherical aberration, the astigmatism, and the distortion of the imaging lens system 4 of SEVENTH EXAMPLE and FIG. 22 shows the lateral aberration.

The spherical aberration, the astigmatism, the distortion and the lateral aberration were all satisfied. From the results, it can be seen that a sufficient optical property can be obtained.

Further, the entire length of the optical system can be set 6.23 mm, which is appropriate for reducing the size and weight in addition to obtaining such excellent optical properties.

Eighth Example

Figure 23:
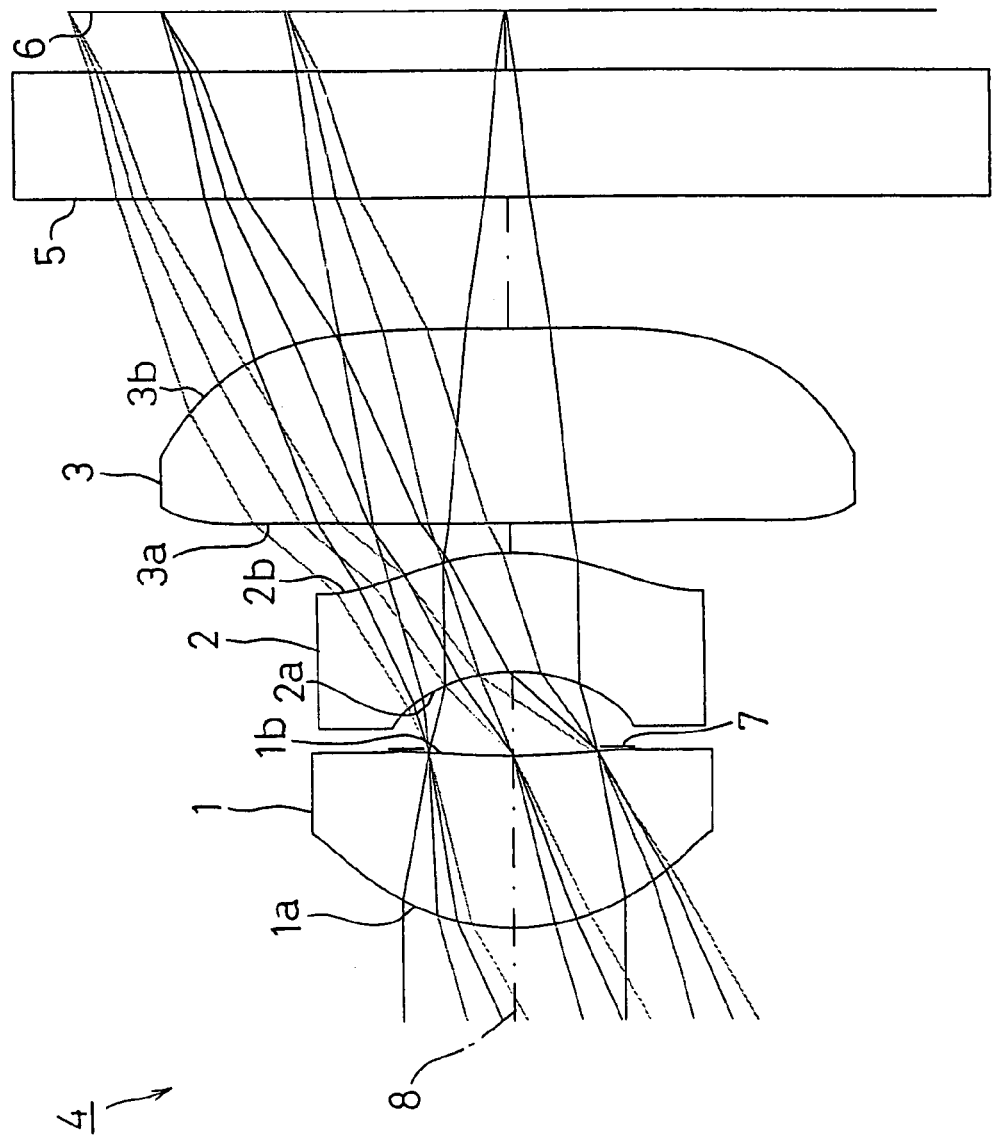
FIG. 23 is a schematic illustration showing EIGHTH EXAMPLE of an imaging lens system according to the present invention.

FIG. 23 shows EIGHTH EXAMPLE of the present invention. In the imaging lens system 4 shown in FIG. 23, the diaphragm 7 was also regarded as the same surface as the second face 1b of the first lens 1 as in FIRST EXAMPLE. Also, in this EXAMPLE, the first lens 1 was formed with glass while the second lens 2 and the third lens 3 were formed using a resin material.

Further, the imaging lens system 4 of EIGHTH EXAMPLE was set under the following conditions.

Under such conditions, $r_1/f = 0.339$, thereby satisfying the conditional expression (1). Also, $r_3/f=-0.254$, thereby satisfying the conditional expression (2). Further, $f/r_2=0.790$, thereby satisfying the conditional expression (3). Furthermore, $f/r_6=0.142$, thereby satisfying the conditional expression (4). Also, $v_1=55.8$, $v_2=27.0$, $v_3=55.8$ were achieved, thereby satisfying each of the conditional expressions (5) to (7).

Figure 24:
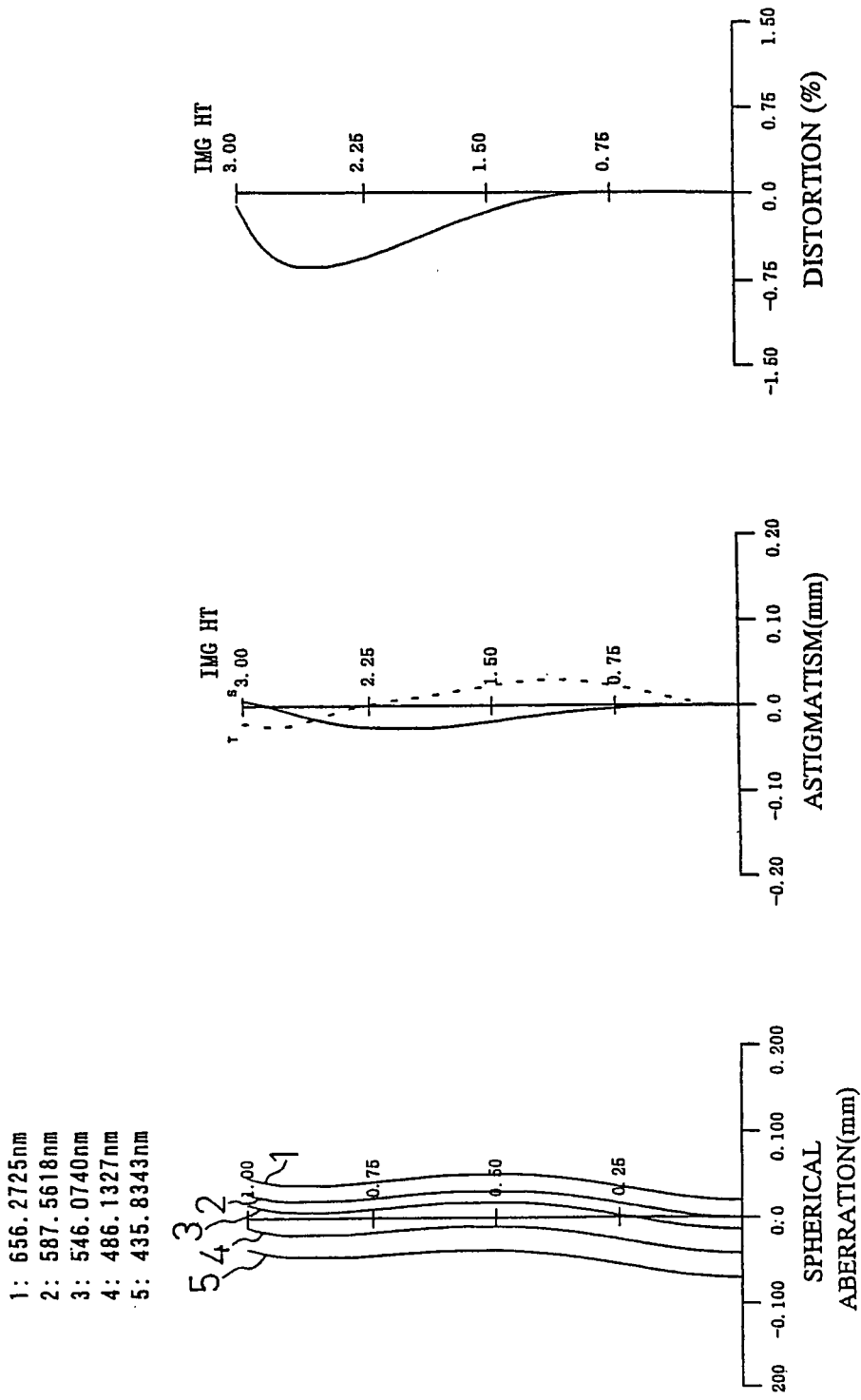
FIG. 24 is an explanatory illustration showing spherical aberration, astigmatism and distortion of the imaging lens system shown in FIG. 23.
Figure 25:
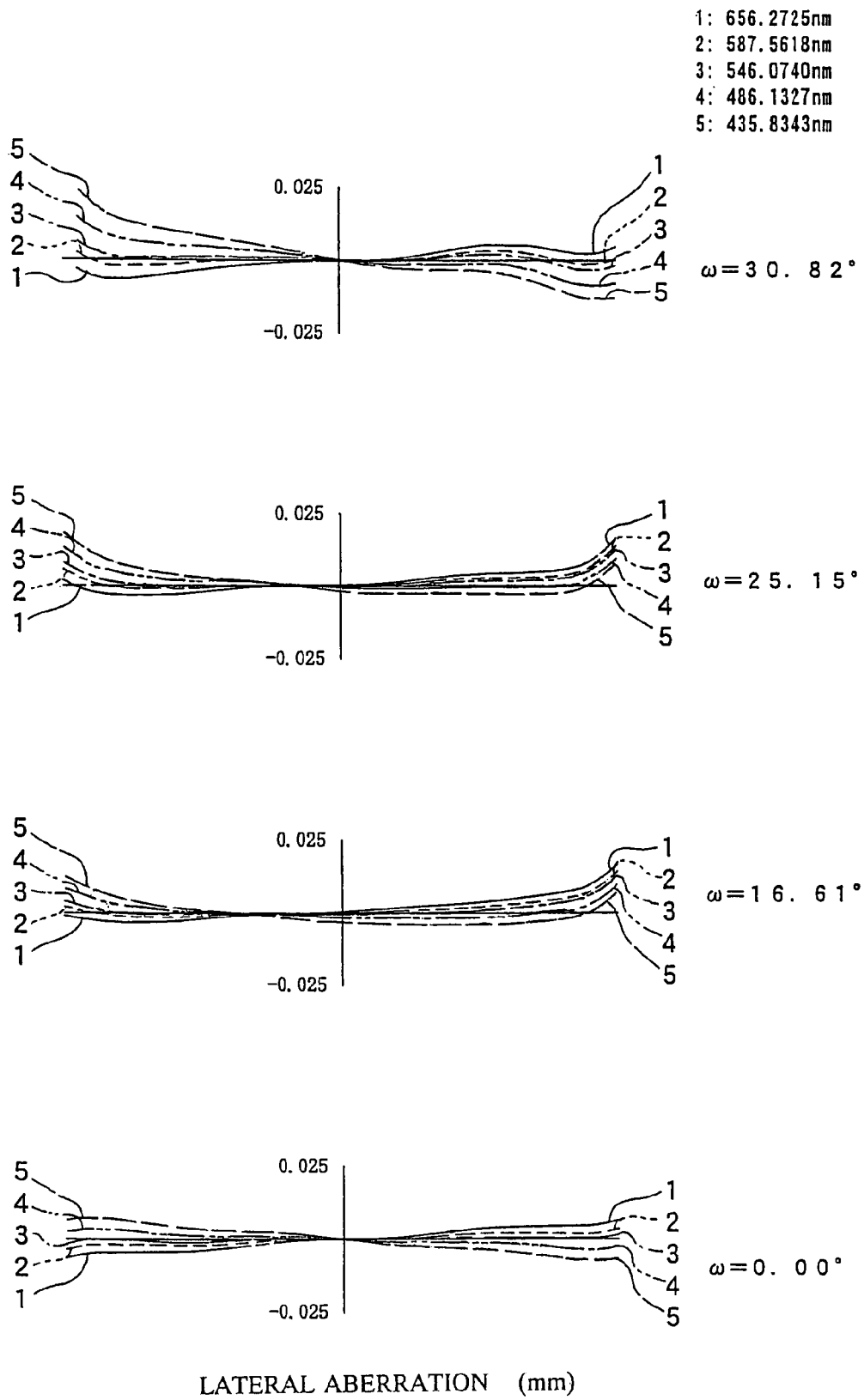
FIG. 25 is an explanatory illustration showing lateral aberration of the imaging lens system shown in FIG. 23.

FIG. 24 shows the spherical aberration, the astigmatism, and the distortion of the imaging lens system 4 of EIGHTH EXAMPLE and FIG. 25 shows the lateral aberration.

The spherical aberration, the astigmatism, the distortion, and the lateral aberration were all satisfied. From the results, it can be seen that a sufficient optical property can be obtained.

Further, the entire length of the optical system can be set 6.22 mm, which is appropriate for reducing the size and weight in addition to obtaining such excellent optical properties.

Ninth Example

Figure 26:
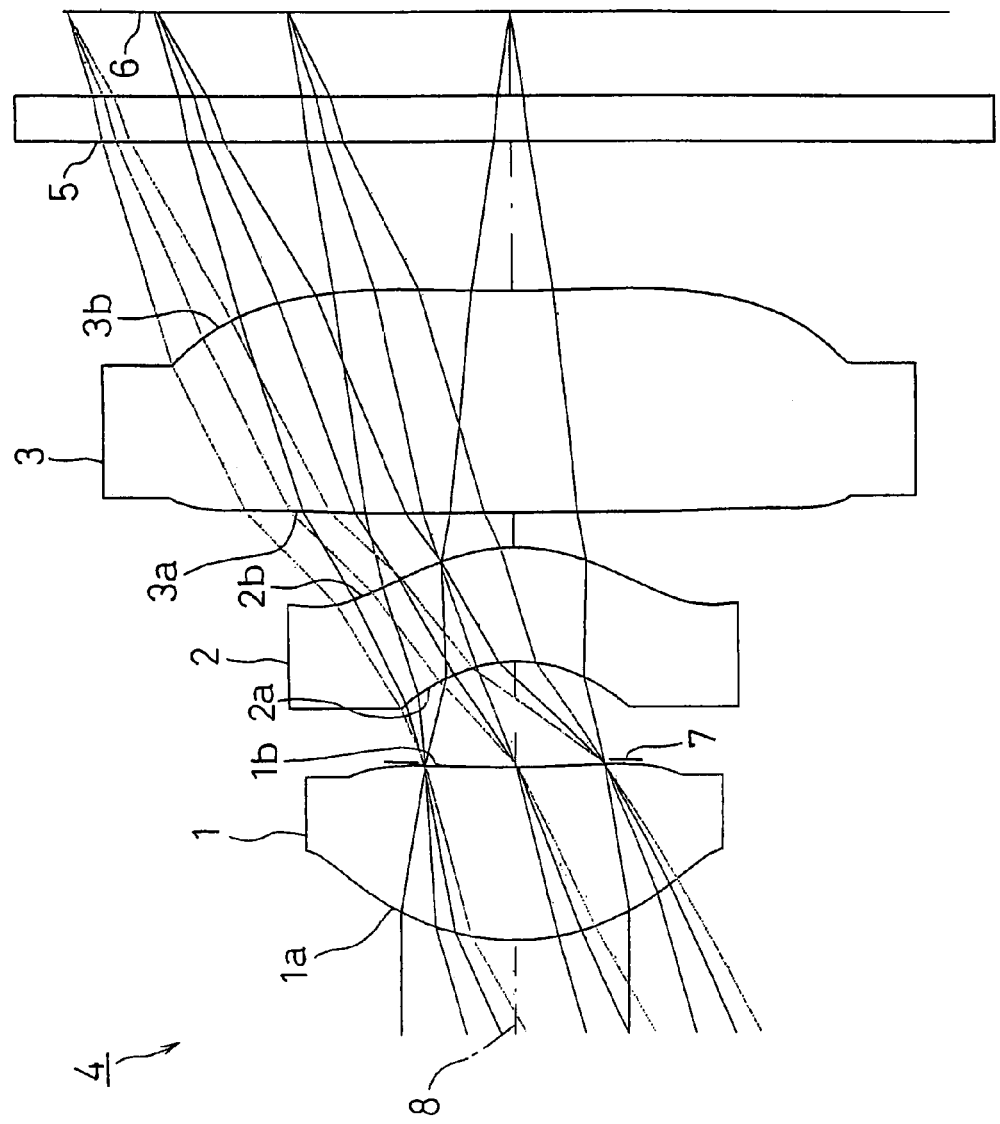
FIG. 26 is a schematic illustration showing NINTH EXAMPLE of an imaging lens system according to the present invention.

FIG. 26 shows NINTH EXAMPLE of the present invention. In the imaging lens system 4 shown in FIG. 26, the diaphragm 7 was also regarded as the same surface as the second face 1b of the first lens 1 as in FIRST EXAMPLE. Each of the first to third lenses 1, 2, 3 was formed using a resin material.

Further, the imaging lens system 4 of NINTH EXAMPLE was set under the following conditions.

| (Lens Data) f = 5.00 mm, F no = 3.18, ω = 30.82° | | | | |
|---|---|---|---|---|
| Face Number | r | d | nd | vd |
| (Object Point) | ∞ | 1000.390 | | |
| 1 (First Face of First Lens) | 1.69337 | 1.177 | 1.5879 | 60.5 |
| 2 (Second Face of First Lens) (Diaphragm) | 6.32826 | 0.572 | | |
| 3 (First Face of Second Lens) | −1.26886 | 0.803 | 1.6070 | 27.0 |
| 4 (Second Face of Second Lens) | −1.73044 | 0.200 | | |
| 5 (First Face of Third Lens) | 180.34907 | 1.318 | 1.5300 | 55.8 |
| 6 (Second Face of Third Lens) | 35.09473 | 0.900 | | |
| 7 (First Face of Cover Glass) | ∞ | 0.850 | 1.5168 | 64.2 |
| 8 (Second Face of Cover Glass) | ∞ | 0.400 | | |
| (Image Surface) | ∞ | | | |

| Face No. | k | A | B | C | D |
|---|---|---|---|---|---|
| 1 | −6.152712 | 0.154940e+00 | −0.825700e−01 | 0.489081e−01 | −0.142305e−01 |
| 2 | 0.000000 | −0.703558e−02 | −0.558910e−01 | 0.000000e+00 | 0.000000e+00 |
| 3 | 1.047747 | 0.770778e−01 | 0.714118e−01 | 0.000000e+00 | 0.000000e+00 |
| 4 | 0.146880 | 0.818144e−01 | 0.238126e−01 | 0.000000e+00 | 0.000000e+00 |
| 5 | −0.016641 | 0.856203e−02 | −0.482609e−02 | 0.678552e−03 | 0.000000e+00 |
| 6 | 0.000000 | −0.332226e−01 | 0.436031e−02 | −0.778254e−03 | 0.295017e−04 |

(Lens Data)
f = 5.00 mm, F no = 3.18, ω = 31.07°

| Face Number | r | d | nd | νd |
|---|---|---|---|---|
| (Object Point) | ∞ | 1000.000 | | |
| 1 (First Face of First Lens) | 1.70744 | 1.133 | 1.5300 | 55.8 |
| 2 (Second Face of First Lens) (Diaphragm) | 10.50357 | 0.691 | | |
| 3 (First Face of Second Lens) | −1.08328 | 0.753 | 1.6070 | 27.0 |
| 4 (Second Face of Second Lens) | −1.32915 | 0.231 | | |
| 5 (First Face of Third Lens) | −47.14464 | 1.443 | 1.5300 | 55.8 |
| 6 (Second Face of Third Lens) | 11.31596 | 1.000 | | |
| 7 (First Face of Cover Glass) | ∞ | 0.300 | 1.5168 | 64.2 |
| 8 (Second Face of Cover Glass) | ∞ | 0.550 | | |
| (Image Surface) | ∞ | | | |

| Face No. | k | A | B | C | D |
|---|---|---|---|---|---|
| 1 | −0.558112 | 0.146741e−01 | −0.356255e−03 | 0.542003e−02 | −0.603058e−02 |
| 2 | 0.000000 | −0.195823e−01 | −0.404354e−01 | 0.000000e+00 | 0.000000e+00 |
| 3 | 0.234555 | 0.612650e−01 | 0.105272e+00 | −0.751360e−02 | −0.139564e−01 |
| 4 | −0.436408 | 0.750741e−01 | 0.380277e−01 | −0.567717e−03 | −0.111261e−02 |
| 5 | −1.000000 | 0.168849e−01 | −0.395563e−02 | −0.202436e−03 | 0.987121e−04 |
| 6 | −1.000000 | −0.424165e−01 | 0.823418e−02 | −0.121054e−02 | 0.546764e−04 |

Under such conditions, $r_1/f=0.342$, thereby satisfying the conditional expression (1). Also, $r_3/f=-0.217$, thereby satisfying the conditional expression (2). Further, $f/r_2=0.476$, thereby satisfying the conditional expression (3). Furthermore, $f/r_6=0.442$, thereby satisfying the conditional expression (4). Also, $\nu_1=55.8$, $\nu_2=27.0$, $\nu_3=55.8$ were achieved, thereby satisfying each of the conditional expressions (5) to (7).

Figure 27:
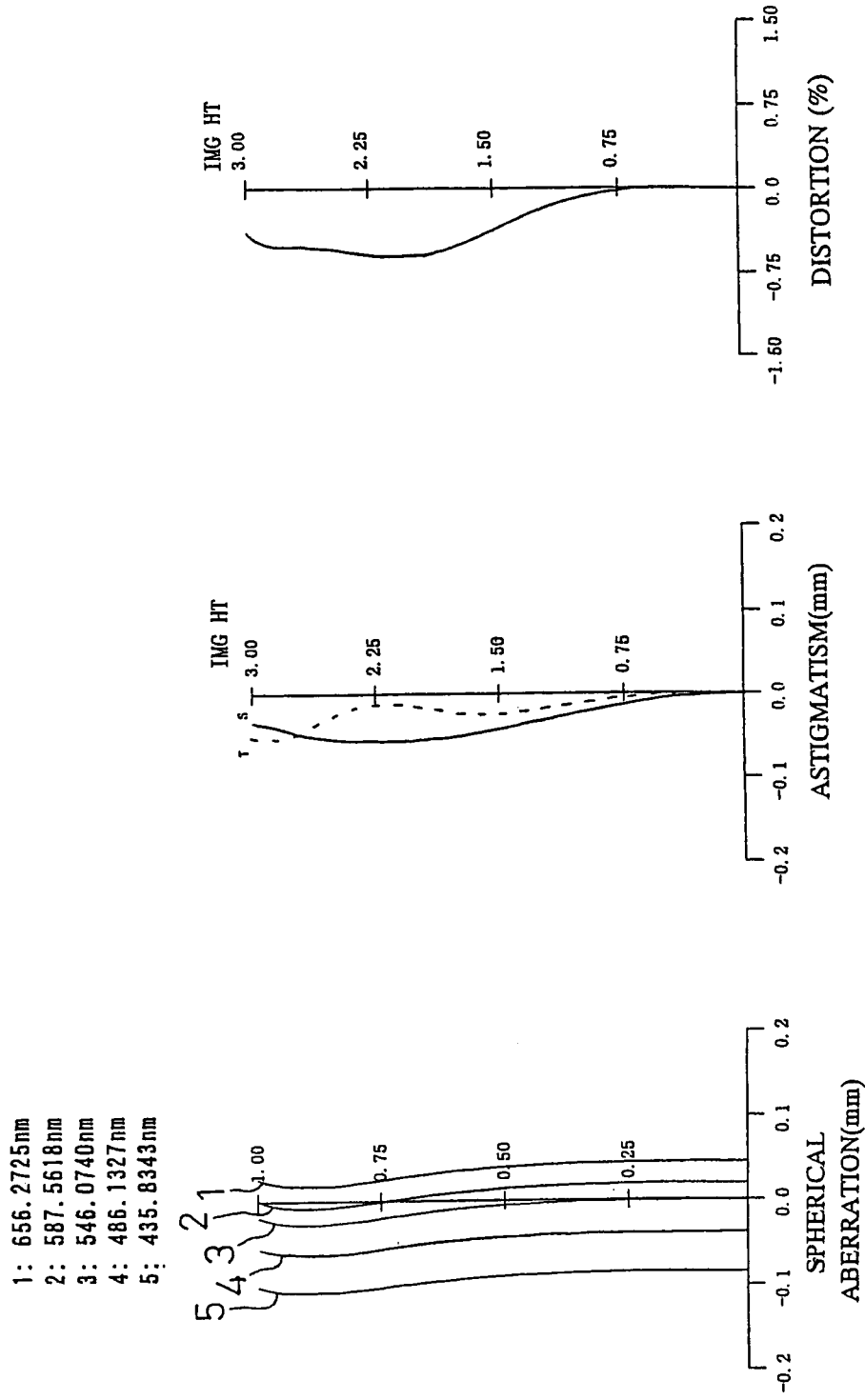
FIG. 27 is an explanatory illustration showing spherical aberration, astigmatism and distortion of the imaging lens system shown in FIG. 26.

FIG. 27 shows the spherical aberration, the astigmatism, and the distortion of the imaging lens system 4 of NINTH EXAMPLE and FIG. 28 shows the lateral aberration.

The spherical aberration, the astigmatism, the distortion and the lateral aberration were all satisfied. From the results, it can be seen that a sufficient optical property can be obtained.

Further, the entire length of the optical system can be set 6.101 mm, which is appropriate for reducing the size and weight in addition to obtaining such excellent optical properties.

The present invention is not limited to the above-described embodiment but various modifications are possible as necessary.

What is claimed is:

1. An imaging lens system, comprising, in order from an object side to an imaging surface side: a first lens having a main positive power with its convex surface facing the object side; a second lens in a meniscus shape with its concave surface facing the object side; and a third lens functioning as a correction lens, wherein
 a diaphragm is provided between said first lens and said second lens; and
 said imaging lens system satisfies each of following conditional expressions (1), (2):

$$0.25 < r_1/f < 0.50 \quad (1)$$

$$-0.27 < r_3/f < -0.19 \quad (2)$$

where, $r_1$: a radius of center curvature of a surface (first face) of said first lens on the object sides,
 $r_3$: a radius of center curvature of a surface (first face) of said second lens on the object side, and
 f: a focal distance of an entire lens system.

2. The imaging lens system according to claim 1, wherein, further, a following conditional expression (3) is to be satisfied:

$$-0.90 < f/r_2 < 1.20 \quad (3)$$

where, $r_2$: a radius of center curvature of a surface (second face) of said first lens on the imaging surface side.

3. The imaging lens system according to claim 2, wherein, further, a following conditional expression (4) is to be satisfied:

$$-0.22 < f/r_6 < 1.30 \quad (4)$$

where, $r_6$: a radius of center curvature of a surface (second face) of said third lens on the imaging surface side.

4. The imaging lens system according to claim 3, wherein, further, each of following conditional expressions (5) to (7) is to be satisfied:

$$40 \leq \nu_1 \leq 72 \quad (5)$$

$$20 \leq \nu_2 \leq 40 \quad (6)$$

$$40 \leq \nu_3 \leq 72 \quad (7)$$

where, $\nu_1$: Abbe number of said first lens,
 $\nu_2$: Abbe number of said second lens, and
 $\nu_3$: Abbe number of said third lens.

5. The imaging lens system according to any one of claims 1 to 4, wherein the surface of said third lens on the imaging surface side is in a shape which curves towards the object side from its center towards a peripheral side.

6. An imaging lens system, comprising, in order from an object side to an imaging surface side: a first lens having a main positive power with its convex surface facing the object side; a second lens in a meniscus shape with its concave surface facing the object side;
 and a third lens functioning as a correction lens and being in a meniscus shape with its convex surface facing the object side, wherein a diaphragm is provided between said first lens and said second lens; and said imaging lens system satisfies each of following conditional expressions (1), (2):

$$0.25 < r_1/f < 0.50 \qquad (1)$$

$$-0.27 < r_3/f < -0.19 \qquad (2)$$

where, $r_1$: a radius of center curvature of a surface (first face) of said first lens on the object side, $r_3$: a radius of center curvature of a surface (first face) of said second lens on the object side, and f: a focal distance of an entire lens system.

7. The imaging lens system according to claim 6, wherein, further, a following conditional expression (3) is to be satisfied:

$$-0.90 < f/r_2 < 1.20 \qquad (3)$$

where, $r_2$: a radius of center curvature of a surface (second face) of said first lens on the imaging surface side.

8. The imaging lens system according to claim 7, wherein, further, a following conditional expression (4) is to be satisfied:

$$-0.22 < f/r_6 < 1.30 \qquad (4)$$

where, $r_6$: a radius of center curvature of a surface (second face) of said third lens on the imaging surface side.

9. The imaging lens system according to claim 8, wherein, further, each of following conditional expressions (5) to (7) is to be satisfied:

$$40 \leq \nu_1 \leq 72 \qquad (5)$$

$$20 \leq \nu_2 \leq 40 \qquad (6)$$

$$40 \leq \nu_3 \leq 72 \qquad (7)$$

where, $\nu_1$: Abbe number of said first lens, $\nu_2$: Abbe number of said second lens, and $\nu_3$: Abbe number of said third lens.

10. The imaging lens system according to any one of claims 7 to 9, wherein the surface of said third lens on the imaging surface side is in a shape which curves towards the object side from its center towards a peripheral side.

* * * * *